United States Patent [19]

Nitta et al.

[11] Patent Number: 5,224,059

[45] Date of Patent: Jun. 29, 1993

[54] DEVICE FOR MEASURING ALTITUDE AND BAROMETRIC PRESSURE

[75] Inventors: Tatsuo Nitta; Toshio Umemoto, both of Kawagoe; Hiroyuki Kihara, Kodaira, all of Japan

[73] Assignee: Citizen Watch Co., Ltd., Tokyo, Japan

[21] Appl. No.: 794,848

[22] Filed: Nov. 21, 1991

Related U.S. Application Data

[63] Continuation of Ser. No. 342,783, Apr. 25, 1989, abandoned.

[30] Foreign Application Priority Data

Jun. 7, 1988 [JP] Japan .................................. 63-138313
Dec. 16, 1988 [JP] Japan .................................. 63-316216

[51] Int. Cl.$^5$ .................................................. G04B 47/06
[52] U.S. Cl. .................................. 364/558; 364/571.01; 364/705.01; 73/384; 73/4 R; 368/11
[58] Field of Search ............ 364/558, 433, 571.01, 364/571.03, 705.01; 73/179, 4 R, 384–387; 377/19; 368/10, 11, 14

[56] References Cited

U.S. PATENT DOCUMENTS

| | | |
|---|---|---|
| 3,031,591 | 4/1962 | Cary et al. . |
| 3,198,013 | 8/1965 | Erdely .................................. 73/398 |
| 3,505,808 | 4/1970 | Eschle .................................. 368/295 |
| 3,839,626 | 10/1974 | Klem et al. .......................... 364/558 |
| 3,958,108 | 5/1976 | Shimomura ......................... 364/558 |
| 4,107,995 | 8/1978 | Ligman et al. ...................... 73/300 |
| 4,109,140 | 8/1978 | Etra ..................................... 235/92 |
| 4,188,825 | 2/1980 | Farrar .................................. 73/291 |
| 4,257,112 | 3/1981 | Hubner ................................ 368/11 |
| 4,257,115 | 3/1981 | Hatuse et al. ....................... 368/69 |
| 4,279,028 | 7/1981 | Lowdenslager et al. ........... 368/11 |
| 4,352,168 | 9/1982 | Anderson ............................ 368/10 |
| 4,413,527 | 11/1983 | Sugiura et al. ..................... 73/754 |
| 4,533,256 | 8/1985 | Ostendorf ........................... 368/111 |
| 4,539,843 | 9/1985 | Wise .................................... 73/179 |
| 4,586,136 | 4/1986 | Lewis ............................. 364/558 X |
| 4,611,923 | 9/1986 | Kawahara ............................ 368/10 |
| 4,667,513 | 5/1987 | Baer .................................... 73/386 |
| 4,694,694 | 9/1987 | Vlakancic et al. .................. 368/14 |
| 4,715,003 | 12/1987 | Keller et al. ..................... 364/571.03 |
| 4,765,188 | 8/1988 | Krechmery et al. ........... 364/558 X |
| 4,779,461 | 10/1988 | Gilman et al. ................... 73/384 X |
| 4,783,772 | 11/1988 | Umemoto et al. .................. 368/11 |
| 4,835,716 | 5/1989 | Tamaki et al. .................. 368/14 X |
| 4,879,669 | 11/1989 | Kihara et al. ....................... 368/11 |
| 4,977,509 | 12/1990 | Pitchford et al. ................... 364/449 |
| 5,001,476 | 3/1991 | Vermilion et al. ................. 364/433 |

FOREIGN PATENT DOCUMENTS

| | | |
|---|---|---|
| 35866 | 10/1969 | Australia . |
| 98321 | 1/1984 | European Pat. Off. . |
| 2711343 | 9/1978 | Fed. Rep. of Germany . |
| 3228144 | 4/1983 | Fed. Rep. of Germany . |
| 3439644 | 4/1986 | Fed. Rep. of Germany . |
| 53-144776 | 12/1978 | Japan . |
| 55-22125 | 2/1980 | Japan . |
| 57-135386 | 8/1982 | Japan . |
| 59-159083 | 9/1984 | Japan . |
| 598572 | 4/1978 | Switzerland . |

OTHER PUBLICATIONS

Electronics & Wireless World 92 (1986) Jun., No. 1604 pp. 36–37.

Primary Examiner—Parshotam S. Lall
Assistant Examiner—Ed Pipala
Attorney, Agent, or Firm—Finnegan, Henderson, Farabow, Garrett, and Dunner

[57] ABSTRACT

A device for measuring altitude and barometric pressure having a barometric pressure sensor, an amplifying circuit for amplifying the output signal from the pressure sensor, an analog to digital converter for converting the output signal from the amplifying circuit to a digital signal, and an altitude information generator for generating altitude information from the output signal of the analog to digital converter. A display displays the altitude information from the altitude information generator and the pressure information detected by the pressure sensor with pressure variation information and converts it into precise altitude information in accordance with temperature compensation data and altitude compensating data based upon regional and time information. The device may be used in climbing or the like with remarkable reliability.

20 Claims, 20 Drawing Sheets

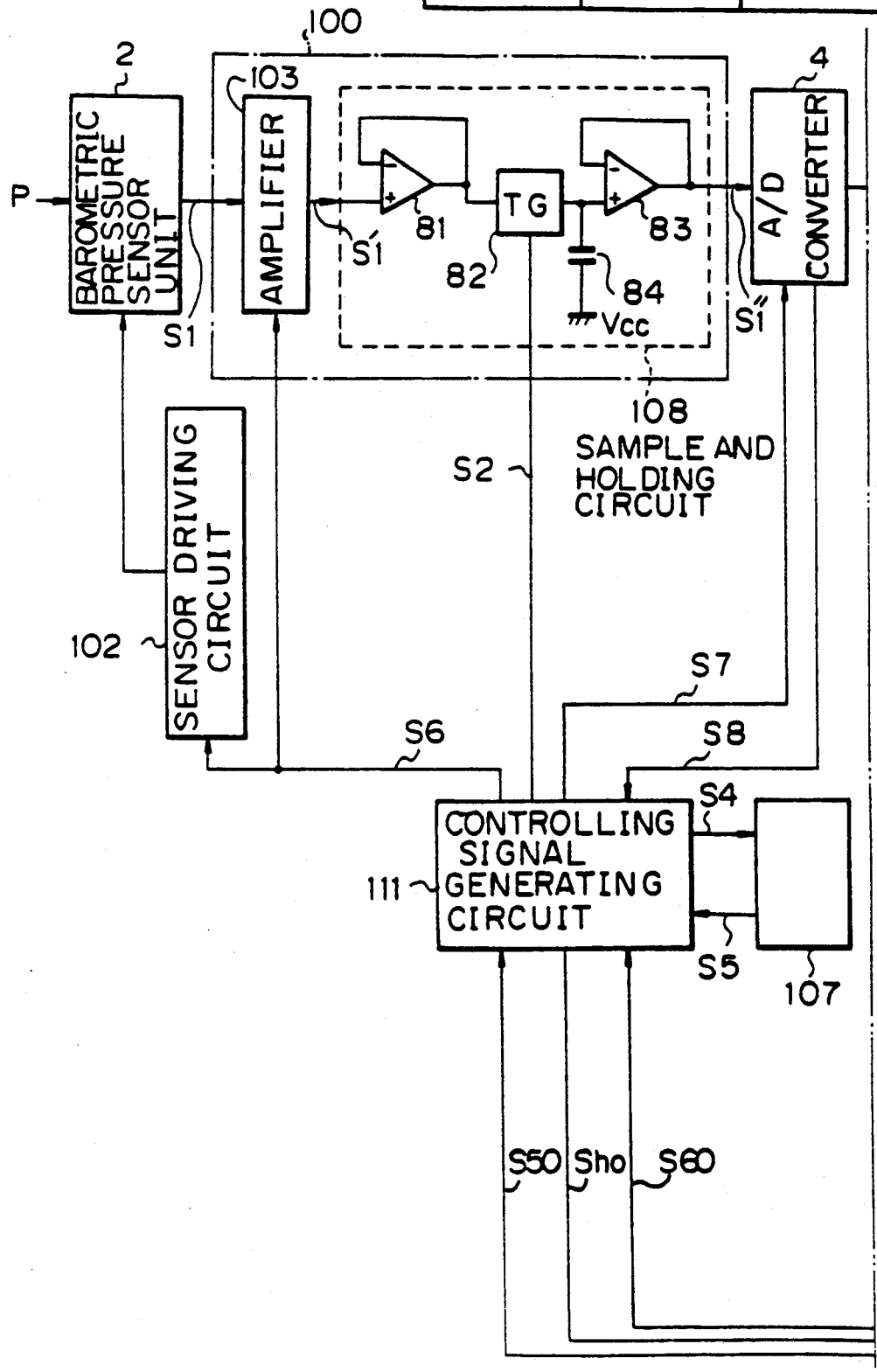

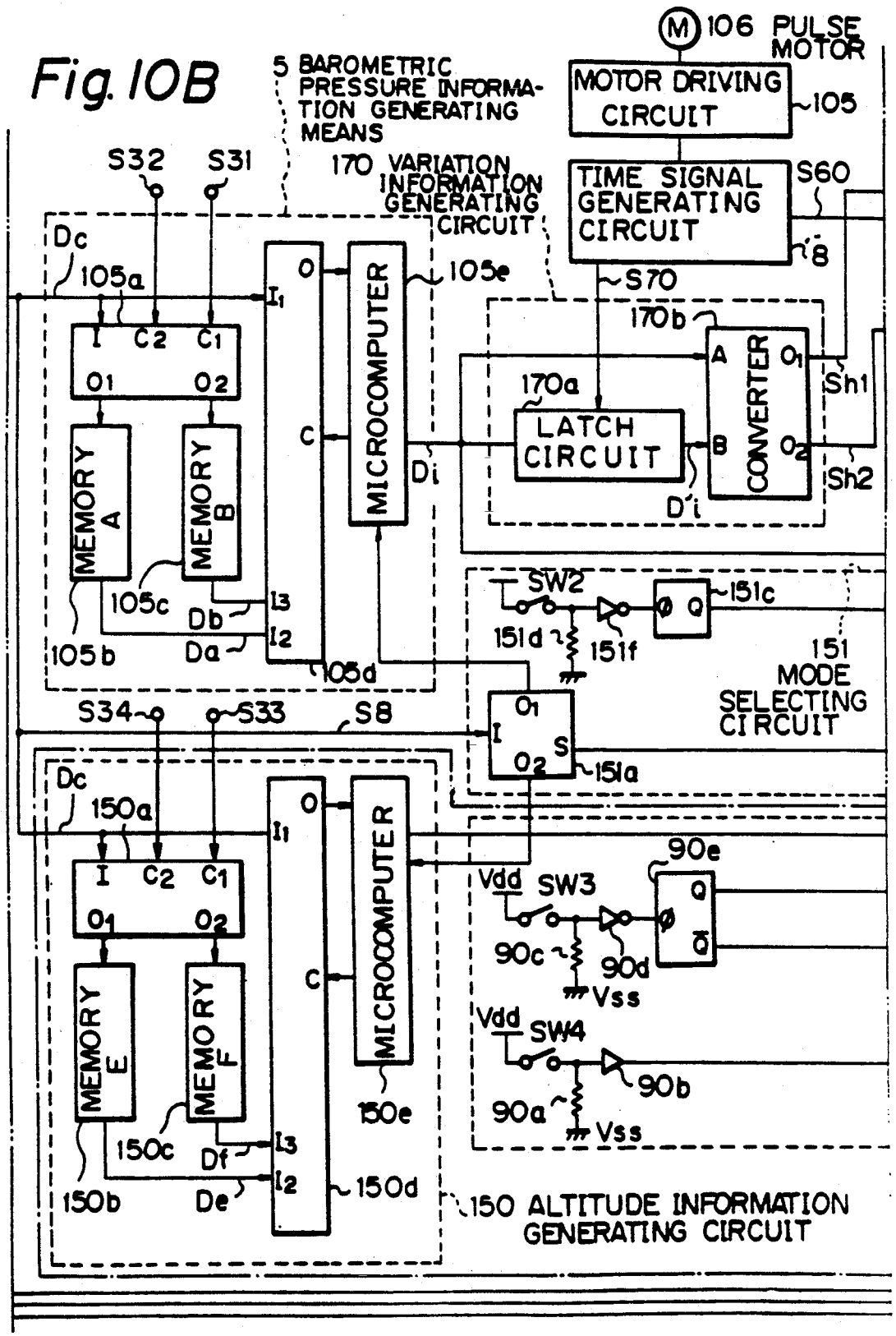

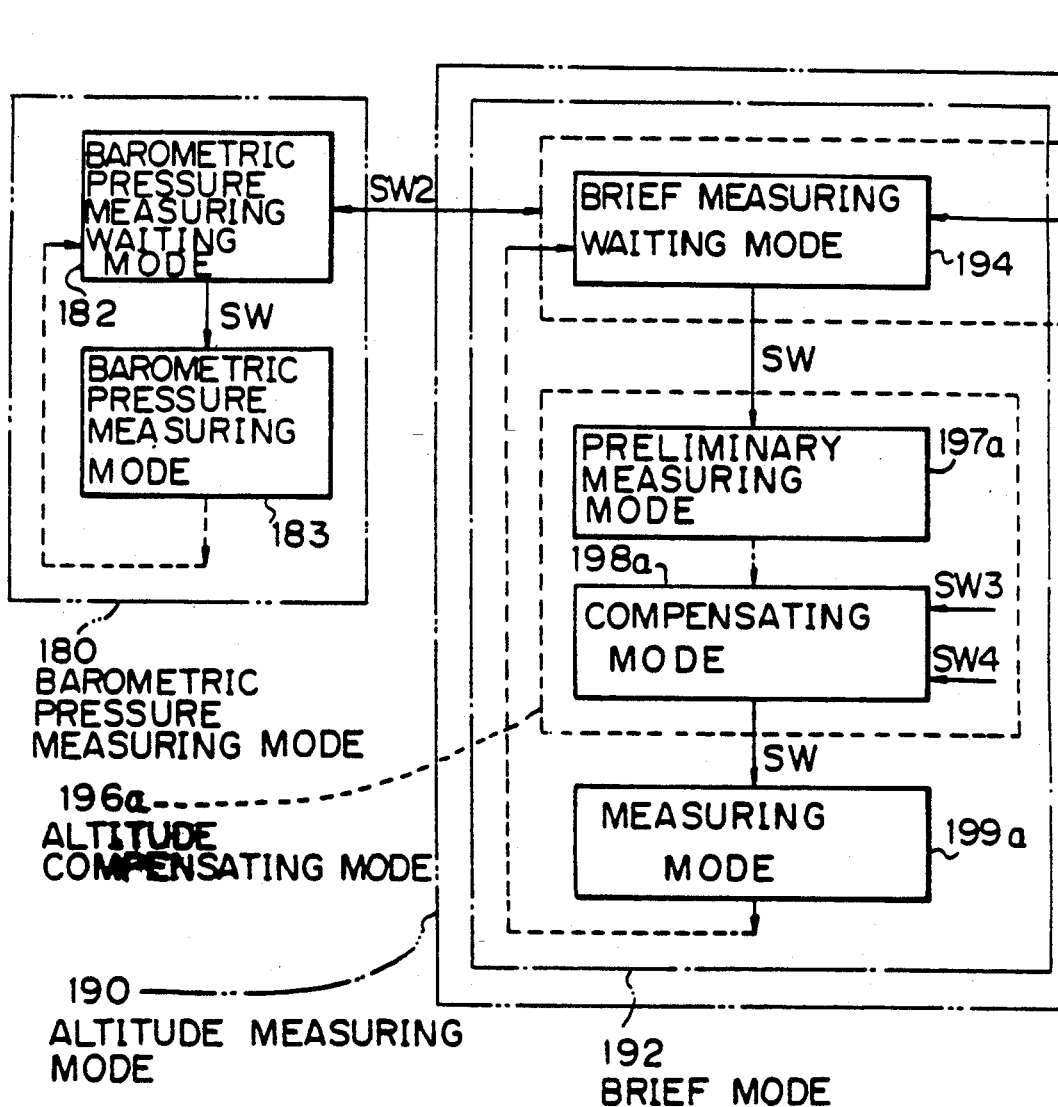

DEVICE FOR MEASURING ALTITUDE AND BAROMETRIC PRESSURE

This application is a continuation of application Ser. No. 07/342,783 filed Apr. 25, 1989, now abandoned.

BACKGROUND OF THE INVENTION

1. Field of the Invention

The present invention relates to a device for measuring altitude and barometric pressure and providing either altitude information or barometric pressure information by using electrical signal output from a pressure sensor.

2. Description of the Related Art

Recently electronic watches have become multi-functional, being able, for example to measure such things as atmospheric pressure or water pressure, temperature, etc., using a suitable sensor, and displaying that information in addition to normal watch functions such as time, alarm, or the like.

In U.S. Pat. No. 4,783,772, a wristwatch having a water pressure indicating function is disclosed, the main construction thereof relating to a circuit for converting data output from a pressure sensor unit to a pressure value, and the construction of the circuit, the pressure sensor, and the displaying device. This patent also refers to use of this wristwatch as an altitude indicator, although there is no indication how it can be used as an altitude indicator, and no disclosure of technology for measuring altitude with suitable compensation for precisely indicating altitude at any location.

The assignee of this invention had previously proposed the idea of a battery powered device for processing a signal received from a sensor, in the specification of U.S. patent application Ser. No. 07/168,728, now U.S. Pat. No. 4,879,699.

In accordance with this application, the sensor signal processing device is constructed by a sensor signal processing apparatus comprising: a power source unit; a sensor for detecting physical information; a sensor driving circuit for driving the sensor; an analog signal processor for inputting and processing a sensor signal output from said sensor; an A/D converter for converting the sensor signal processed by said analog signal processor into digital data; a data processor for generating sensor data from the digital data output from said A/D converter; and a controlling signal generator for generating control signals for controlling operations of each circuit; and the analog signal processor, being characterized in that the analog signal processor includes a sample-and-hold circuit for sampling-and-holding the sensor signal and supplying the signal to said A/D converter, and said controlling signal generator generates a control signal for operating said sensor driver and said A/D converter at different timing and operating said sample-and-hold circuit within a driving period of said sensor driver.

In the application, a small portable electronic device, such as an electric watch, provided with a function for measuring only an barometric pressure, is disclosed as an example. However, the technology for measuring altitude is not disclosed.

This kind of portable barometric pressure measuring device is used frequently for mountain climbing so it would be very convenient if not only the pressure but also altitude could be measured simultaneously. The present invention was created in response to this requirement; and an object of the present invention is to provide a barometric pressure and altitude measuring device capable of displaying altitude and/or pressure information by using a sensor and circuit commonly used for measuring pressure, without greatly increasing the production cost.

Another object of the present invention is to provide a precision altitude measuring device with a reduce error factor caused by the variation in temperature at sea level.

Still another object of the present invention is to provide a wristwatch having an altitude display capability.

It is apparent that altitude cannot accurately be measured using only a conventional pressure sensor. A conventional portable altitude measuring device generally measures barometric pressure using an Aneroid Barometer and displays the altitude by converting the measured barometric pressure into altitude based on the standard atmosphere defined as a pressure of 1013.25 mb at sea level at temperature of 15° C. In this method, a suitable mechanical gauge can be used to display the altitude measured as explained above.

However, the above method of measuring and displaying altitude information is susceptible to error caused by changes in temperature and barometric pressure.

Accordingly, when the above type of altitude measuring device is used for mountain climbing or the like, it is necessary to adjust the device at some known altitude in order to reduce the error caused by changes in temperature or barometric pressure.

A standard unit of barometric Pressure, known as an atmosphere, has been adopted internationally. The international standard barometric or ICAO standard atmosphere was adopted by the International Civil Aviation Organization in 1964, and shows the relationship between altitude, barometric pressure, and temperature as follows:

$$H = 153.85 \times T_0 \times [1 - (P/P_0)^{0.190255}] \quad (1)$$

Wherein, $T_0 = 288.15$ K., $P =$ the barometric pressure at the location where the measurement is carried out and $P_0 = 1013.25$ mbar at sea level, and wherein K is the Kelvin temperature scale and 288.15 K. corresponds to 15.0° C.

The equation (1) above is defined at a temperature variation rate of $-6.5°$ C./1000 m, i.e., a 6.5° C. reduction in temperature for every 1000 m increase in altitude. In equation (1), $T_0$ represents the temperature of the atmosphere at sea level, and $P_0$ represents the barometric pressure at sea level. As is apparent from equation (1), the relationship between temperature and barometric pressure will vary with respect to altitude. When the above altitude measuring device is actually used, the temperature and the pressure at sea level may of course vary from 15.0° C. and 1013.25 mbar of the standard atmosphere, and moreover, the temperature variation rate in different regions, seasonal conditions, climate, latitude, or the like make it very difficult to accurately measure altitude using the above method, and it is considered necessary to compensate the altitude measurement thus obtained at some known altitude.

For example, when the temperature at sea level is 15.0° C. and the pressure is 1030 mbar, which is not the standard atmosphere while the actual pressure at 1000 m altitude above sea level will be 913.5 mbar, the altitude measured utilizing the relationship between the barometric pressure and the altitude based on the standard atmosphere will show an altitude of 865 m, while under the same conditions the pressure of 859.5 mbar at an altitude of 1500 m above sea level will lead to an altitude measurement of 1365 m.

That indicates that an altitude measurement taken at an altitude of 1000 m or 1500 m will have an error of −135 m.

If the compensation material above is made at some location known to be exactly 1000 m above sea level then a subsequent measurement at an altitude of 1500 m, will show 1500 m (1365 $m$+135$m$=1500$m$).

In the same way, when the barometric pressure at sea level is 980 mbar, an altitude measurement taken at 1000 m above sea level will indicate 1274 m, and a measurement taken at an altitude of 1500 m will indicate 1771 m. If a compensation of −274 m is made at a location known to be 1000 m, an altitude measurement taken at an altitude of 1500 m will indicate 1497 m (1771$m$−274$m$=1497$m$), reducing the error into only −3 m.

Thus the error in altitude measurement caused by variations in barometric pressure at sea level can be reduced to a point of being negligible.

However, another problem with the prior art measurement method, is apparent from equation (1). Large errors in altitude measurement can result from variations in the temperature of the atmosphere at sea level. The most significant error factor in equation (1) when measuring altitude is the temperature $T_0$ at sea level. The error resulting when the temperature varies will be larger than that caused by variations in pressure.

That means, even when the error is compensated at a known reference place to adjust the altitude indicated by the altitude measuring device utilizing the above equation to the actual altitude, an error will occur in proportion to the error of the absolute temperature at sea level, with respect to the relative altitude, which is either higher or lower than that of the place at which the adjustment is being carried out.

For example, when the barometric pressure is 1013.25 mbar and the temperature is 0° C. at sea level, an altitude measurement will indicate 1055 m at an actual altitude of 1000 m above sea level, and 1582 m at an actual altitude of 1500 m above sea level.

Even it a compensation of −55 m is made at a known altitude of 1000 m, the device will still indicate 1527 m at an altitude of 1500 m resulting in an error of 27 m.

As can be seen from the above explanation, if the pressure at sea level is known, a more precise altitude measurement can be made, and when both the temperature and the pressure at sea level are known, a much more precise altitude measurement can be made.

SUMMARY OF THE INVENTION

The object of the present invention is to provide a device for measuring barometric pressure and altitude; and for displaying the same without increasing production cost, by using a commonly available sensor and related circuit as the components thereof.

Another object of the present invention is to provide a device with which accurate altitude information can be obtained.

To attain the above objects, the present invention comprises a pressure sensor, an amplifying circuit for amplifying the output signal from the barometric pressure sensor, an analog to digital converter for converting the output signal from the amplifying circuit to a digital signal, an altitude information generating means for generating altitude information from the output signal from the analog to digital converter, and a display means for displaying at least the altitude information generated from the altitude information generating means.

BRIEF DESCRIPTION OF THE DRAWINGS

The description herein makes reference to the accompanying drawings.

FIGS. 9, 9A and 9B form a block diagram of the circuitry of a third embodiment of the present invention.

FIGS. 10, 10A, 10B and 10C form a detailed block diagram of the circuitry of the second embodiment of the present invention shown in FIG. 8.

FIGS. 17, 17A and 17B show a block diagram indicating the variation of the mode used in this invention.

DETAILED DESCRIPTION OF THE PREFERRED EMBODIMENTS

In the present invention, as mentioned above, a device is provided with at least an altitude measuring function utilizing a barometric pressure sensor to obtain barometric pressure information which is then converted to altitude information.

Figure 1:
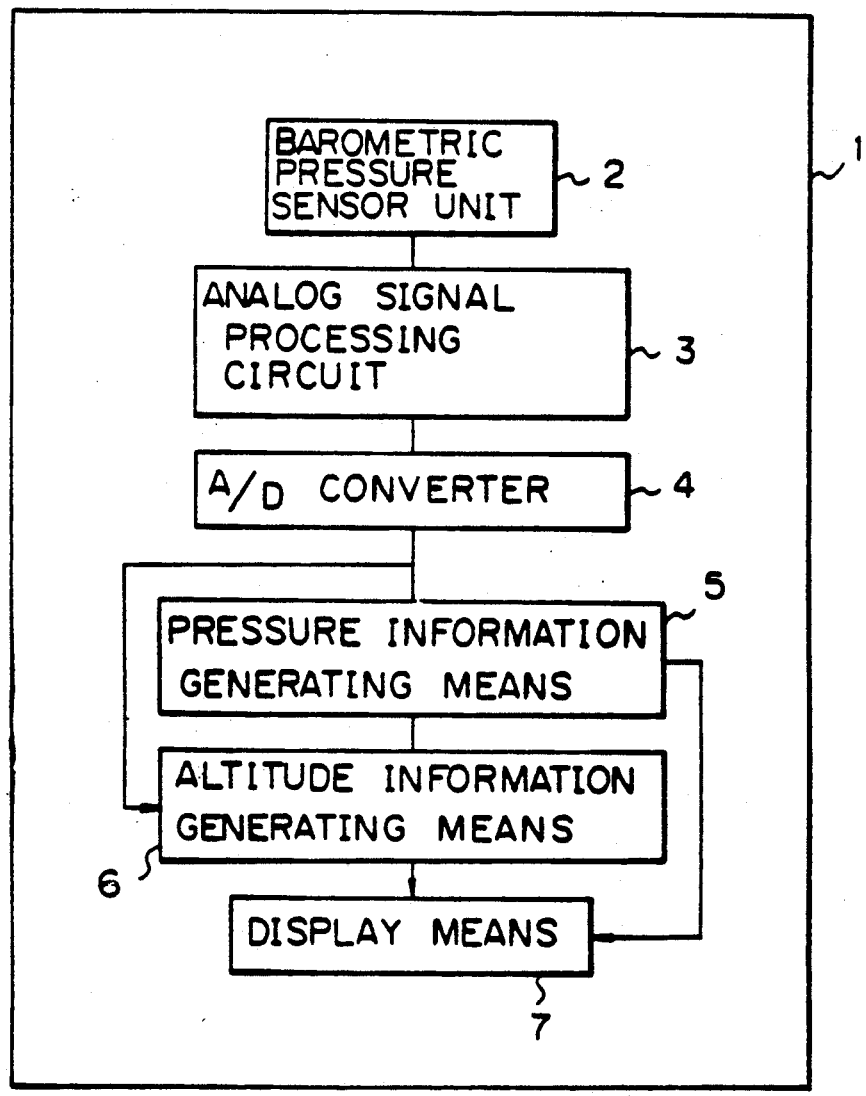
FIG. 1 is a block diagram indicating the basic circuitry of the present invention.

The basic construction of the present invention is shown as a block diagram in FIG. 1.

In FIG. 1, a device 1 for measuring altitude and barometric pressure comprises a barometric pressure sensor unit 2, an analog signal processing circuit 3 for processing the output signal from the pressure sensor, an analog to digital converter 4 for converting the output signal from the analog signal processing circuit to a digital signal, a barometric pressure information generating means 5 for generating barometric pressure (hereafter, "barometric pressure" referred only to as "pressure".) information based on the output signal from the analog to digital converter, an altitude information generating means 6 for generating altitude information based on the output signal from the analog digital converter, and a displaying means 7.

In this block diagram, the A/D converter 4 and the pressure information generating means 5 may be combined into one circuit together with to the altitude information generating means 6. However, if the pressure information is to be processed further, it should be constructed separately from the A/D converter 4.

Accordingly in one embodiment of the present invention, only altitude information is displayed on the display means, but in another embodiment, both pressure and altitude information are displayed.

Preferred embodiments of this invention will be described as examples with reference to the attached drawings.

EXAMPLE 1

An example of the first embodiment of the present invention will be explained with reference to FIG. 2.

Figure 2:
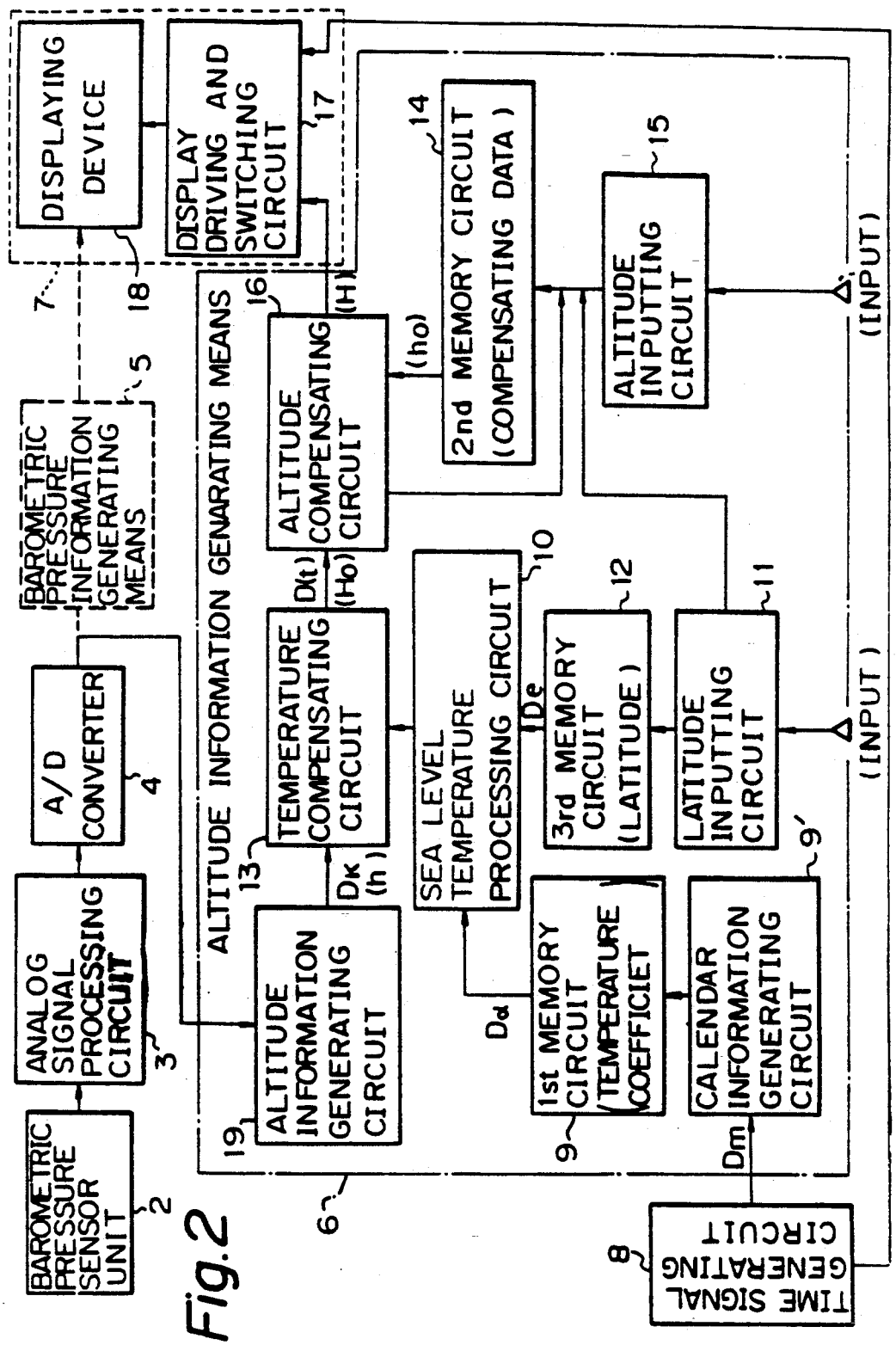
FIG. 2 is a block diagram of the circuitry of a first embodiment of the present invention.

In this embodiment, as shown in FIG. 2, the device is designed to display only altitude information and comprises a pressure sensor 2, an analog signal processing circuit 3, an A/D converter 4, an altitude information generating means 6, display means 7 and a time signal generating circuit 8 for generating a signal to be used as calendar information.

In this device, the display means 7 further comprises a display driving circuit 17 and a display device 18. The altitude information generating means 6 comprises an altitude information generating circuit 19 connected to the A/D converter 4, a temperature compensating circuit 13 for processing the altitude information output from the generating circuit 19, and an altitude compensating circuit 16 for compensating the altitude information output from the temperature compensating circuit 13, and further comprises a first memory circuit 9 for storing calendar information, a temperature coefficient or the like, connected to a calendar information generating circuit 9' driven by the time signal generating circuit 8, a sea level temperature processing circuit 10 connected to the temperature compensating circuit 13 for generating compensation data, utilizing the data output from the first memory circuit 9 and a third memory circuit 12 explained later, a third memory circuit 12 connected to the processing circuit 10 for storing and providing thereto regional information such as latitude information, input from an externally operated input circuit 11 connected to the memory circuit 12, a second memory circuit 14 connected to the altitude compensating circuit 16 for providing altitude compensation data thereto input from the externally operated inputting circuit 15.

The second memory circuit 14 can store the compensated altitude information obtained by compensating the altitude information output from the altitude compensating circuit 16 utilizing the external data input thereinto through the operating circuit 15, i.e., the altitude compensating data inputting circuit operated by the external inputting device, and the altitude compensating circuit 16 can process a compensated altitude representing the actual altitude utilizing the altitude information processed in temperature compensating circuit 13 with the compensated altitude information stored in the second memory 14.

Further, the latitude information inputting circuit 11 is connected to the third memory circuit 12 for storing latitude information, and to the second memory circuit 14, and the third memory circuit 12 is connected to the sea level temperature processing circuit 10.

Figure 19:
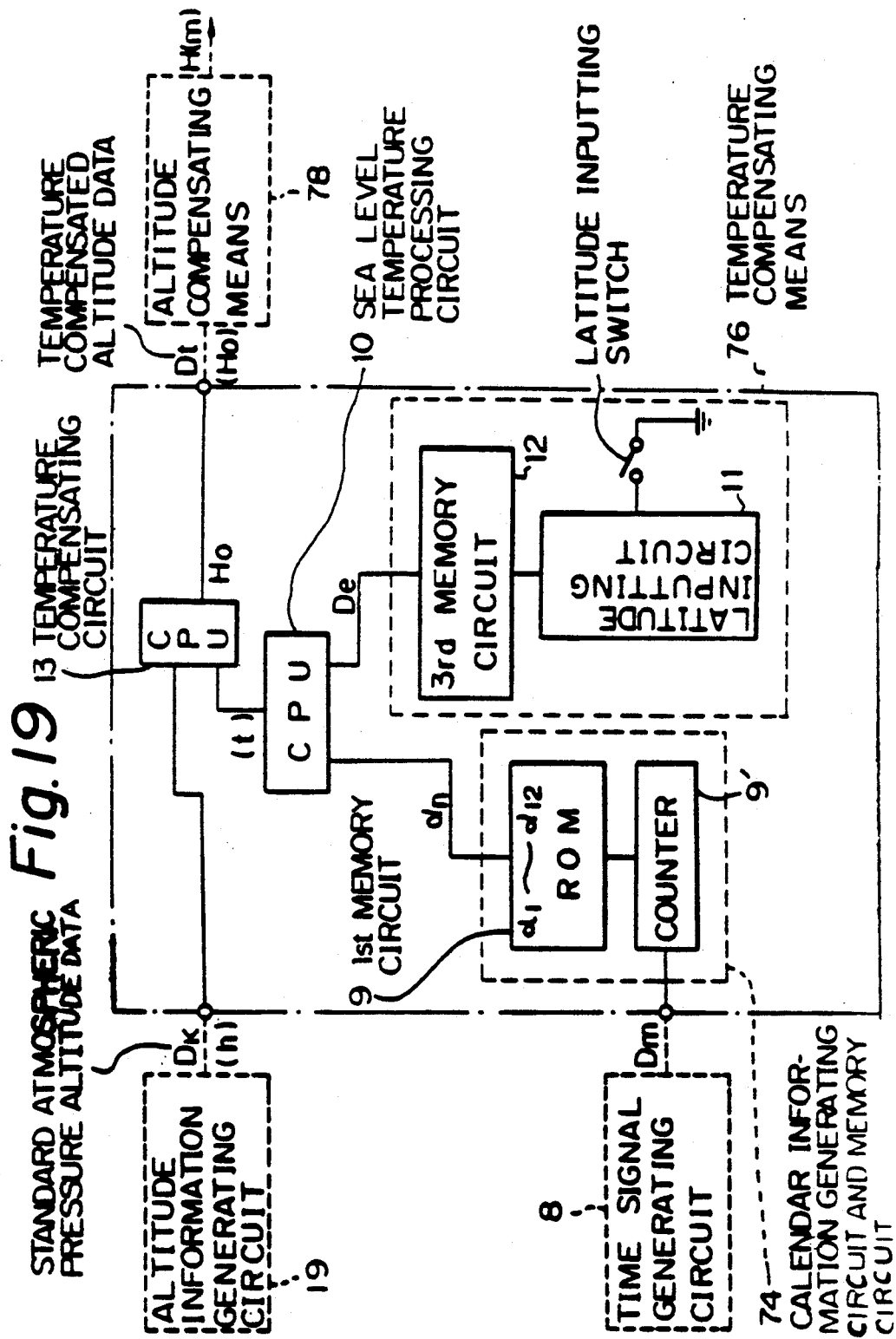
FIG. 19 shows a detail block diagram of the temperature compensating circuit used in the altitude information generating means of this invention.

The above embodiment of the present invention will be further explained hereinafter with reference to FIG. 2 and FIG. 19.

In FIG. 2, the time signal generating circuit 8 has a function of calculating time, month, and date or the like, i.e., the time and date functions which an ordinary digital clock has, and the time or date information generated by the time signal generating measuring circuit 8 can be displayed on the display device 18 driven by the display driving circuit 17. The pressure measured by the pressure sensor 2, made of a semiconductor or the like, is converted into a value representing the pressure, by the A/D converter 4 through an analog signal processing circuit 3. The altitude information generating circuit 19 serves as a processor for calculating an altitude at the standard atmosphere, converting the value of the pressure converted by the A/D converter 4 into an altitude assuming the standard atmosphere and utilizing the equation (1) shown above, with the reference data $P_0 = 1013.25$ and the absolute temperature $T_0$ at a sea level temperature of 15° C. = 288.15K. The memory circuit 9 is used for storing regional information for processing the temperature at sea level at a certain place and at a certain month, and therefore, the circuit contains the temperature coefficient of the temperature at sea level in accordance with month and area as regional information, in its memory. For example, the temperature coefficient thereof is composed a follows.

The relationship between the temperature at sea level and the temperature at a certain area can be represented by the equation (2) shown below derived from temperature data obtained at certain places in Japan for each month of the year.

$$t = -\alpha N + 48 (°C.) \quad (2)$$

Wherein N represents the latitude and t represents the temperature at sea level at the latitude N, and $\alpha$ represents the temperature coefficient mentioned above. The temperature coefficient $\alpha$ is a constant determined for each month.

The difference between the temperature calculated utilizing the equation above with the constant $\alpha$ assumed to be 1.233 in January, 1.224 in February, 1.143 in March and so on, and a temperature obtained by converting the average temperature for each month at several certain places in Japan disclosed in the "Chronological Scientific Table" (edited by Tokyo Astronomical Observatory issued from Maruzen Co., Ltd., in 1988) into the temperature at sea level utilizing a temperature variation ratio of 0.65° C./100 m, will generally fall into the range of +2° C.

In this example, the circuits 9, 9', 10, 11, 12 and 13 mentioned above comprise a temperature compensating means 76, and the circuits 9 and 9' comprise a calender information generating circuit and memory circuit 74. The first memory circuit 9 comprises a ROM for storing the temperature coefficients $\alpha_1 - \alpha_{12}$, and the calender information generating circuit 9' comprises a counter driven by the time signal generating circuit 8. Both the temperature compensating circuit 13 and the sea level temperature processing circuit 10 consist of a microprocessor CPU or the like.

The regional information used in this example, is latitude information, actual altitude information, a temperature coefficient or the like.

The latitude information inputting circuit 11 is a circuit for inputting the latitude information N of a specific location, utilizing an external device such as a switch or the like, and the latitude information N thus input is stored in the third memory circuit 12 which serves as a latitude memory circuit. The sea level temperature processing circuit 10 selects the temperature coefficient $\alpha_n$ from the first memory circuit 9 bases on month data output from the time signal generating circuit 8, and thereafter calculates the temperature at sea level (t) utilizing the equation (2) above with the latitude information De stored in the third memory circuit 12.

A temperature compensated altitude above sea level Ho is calculated utilizing the following equation based upon the altitude above the sea level (h) processed from the latitude information generating circuit 19 assuming a standard atmosphere and upon the date output from the sea level temperature processing circuit 10.

$$H_0(m) = h \times 288.15/(273.15 + t) \quad (3)$$

Wherein $H_0$ represents a temperature compensated altitude and t (°C.) represents the sea level temperature at the input latitude.

It is inevitable, however, that the altitude thus obtained has some error because it is calculated with the assumption that the pressure at sea level would be 1013.25 mb. Therefore, the altitude compensating circuit 16, i.e., the processing circuit in which the actual altitude to be displayed is calculated, is provided and in this circuit, the value of the temperature compensated altitude above sea level $H_0$ output from the temperature compensating circuit 13, is compensated by using the compensation data stored in the second memory 14 with the following equation $$H(m) = H_0 + h_0 \quad (4)$$

Wherein "H" represents a compensated altitude and $h_0$ (m) represents compensation data.

Thereafter, the compensated altitude thus obtained is displayed on the display device 18 driven by the display driving circuit 17 with the current time information.

The compensation data stored in the second memory circuit 14 is initially zero (0) when the latitude information is first input from the latitude information inputting circuit 11 thereto, and the second memory circuit 14 is reset.

As described above, at first, the value of the altitude to be displayed and calculated in the altitude compensating circuit 16 is the same value as the result obtained from the temperature compensating circuit 13 and has an error caused by the variation in pressure at sea level. To eliminate such an error, compensation is carried out in a conventional way, so the altitude displayed on the display device can be compensated to give accurate altitude data by inputting known altitude data generally indicated on a sign at certain location utilizing the altitude compensation information inputting circuit 15 while observing the altitude data displayed on the display device.

Simultaneously with the compensation of the displayed altitude, the compensated value is stored into the second memory circuit 14.

For example, when the value of the altitude displayed on the display device 18 shows 1040 m at a location having an actual altitude of 1000 m, the compensation data of −40 m is input into the altitude compensation information inputting circuit 15 and is simultaneously stored in the second memory circuit 14. Accordingly, this compensation data can be used automatically in subsequent measuring operations, and errors caused by changes in pressure at sea level can be neglected thereafter In this embodiment, the temperature coefficient used was that for the actual month, although the temperature at the sea level can be calculated utilizing a rectilinear compensation method based on the information relating to both month and date to determine the temperature at the sea level at the beginning of the month or at the end of the month, in order to obtain more precise data.

Also in this embodiment, the regional data only applies to Japan, although, it should be considered to input not only altitude data, but also longitude data as the regional information when this invention is to be used world-wide.

In this invention, for as the pressure sensor 2, any kind of conventional pressure sensor can be used, although the pressure sensor explained below is preferably used in this invention.

Figure 3:
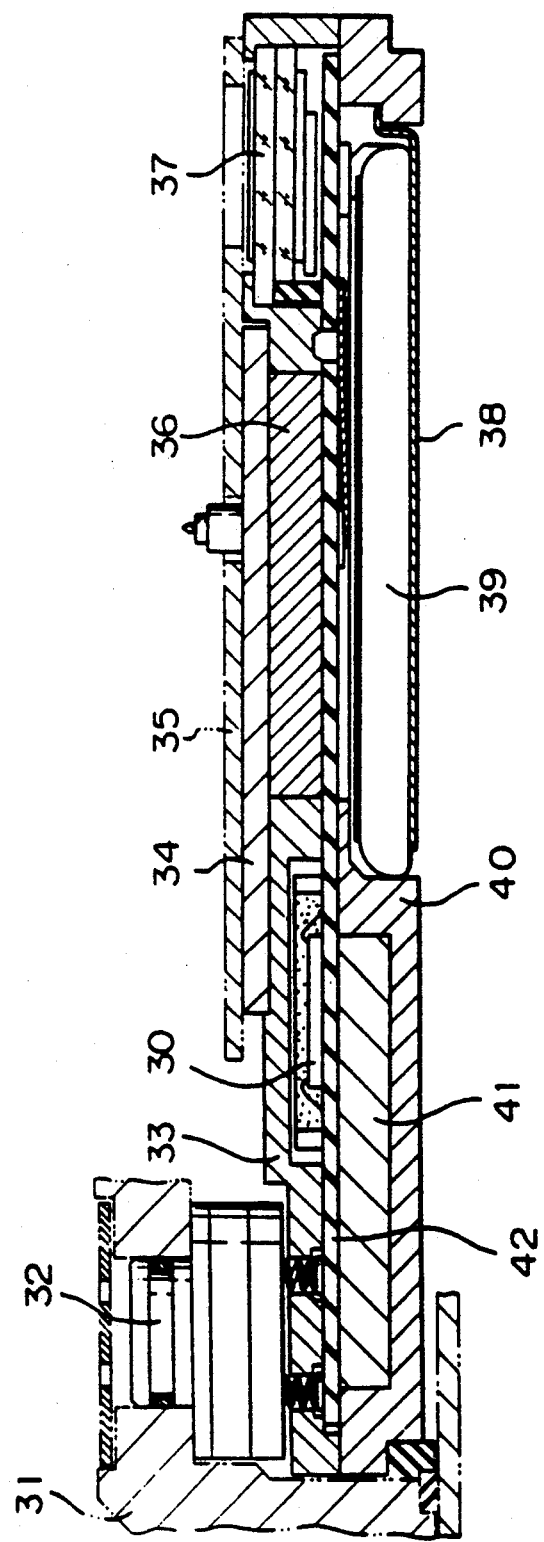
FIG. 3 is a cross sectional view taken along the X—X' line of FIG. 7. of one example of a wristwatch utilizing the present invention for measuring pressure and altitude.
Figure 7:
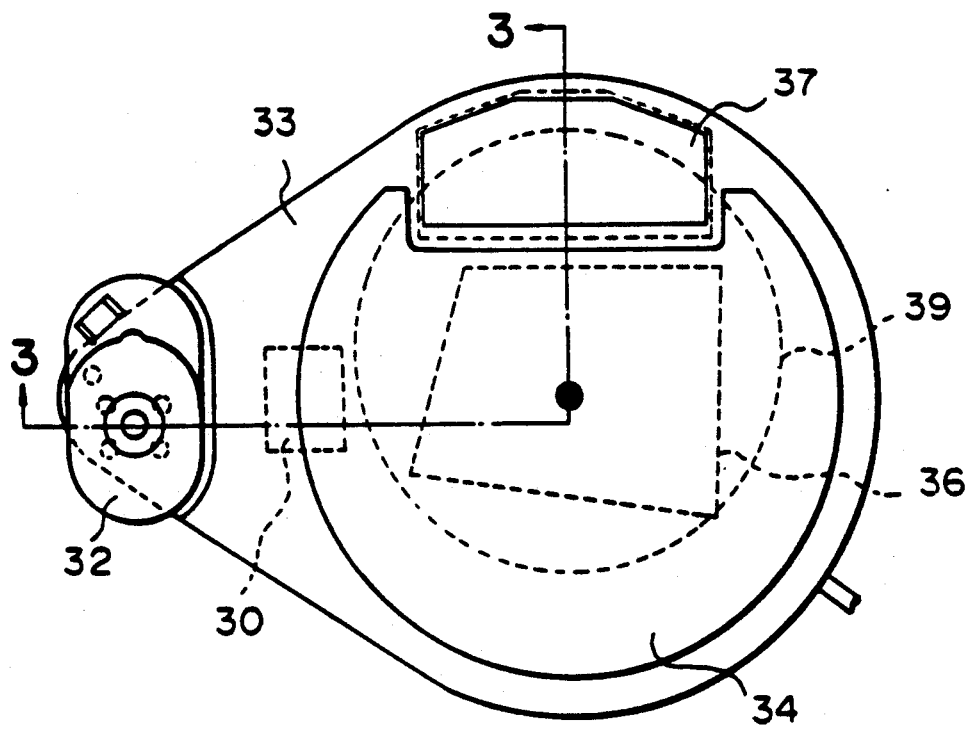
FIG. 7 is a plane view of one example of the device of the present invention indicating the relationship between each of the components used in this device.

In FIG. 3, one specific embodiment of the present invention applied to a wristwatch having the pressure unit 32 is shown in a cross sectional view, taken along the line X—X' in FIG. 7.

In the FIG. 3, in an external body portion 31, a pressure sensor 32, an indicating board 35 with numerical figures thereon provided on a base plate 34, and a display device 37 comprising a liquid crystal cell are provided on one side surface of circuit board 42, and a battery 39 supported by a battery pressing plate 38 and a supporting mount 40 for supporting the circuit board are provided on the opposite side surface thereof.

Further, a liquid crystal cell supporting frame is also provided on the one surface of the circuit board 42 with an integrated circuit 30 and an analog module block 36 therein, and another circuit with several electronic components being mounted thereon is also provided inside the supporting mount 40 on the opposite side of the circuit board 42.

The pressure sensor 32 used in the present invention, is a sensor for converting a sensed pressure into an electrical signal utilizing a piezoresistance effect of a semiconductor diffused resistor having a reduced offset voltage and a low radiation in sensitivity and impedance.

As to a preferable pressure sensor used for this invention, the basic construction thereof is such that a pressure sensor unit 32 which comprises a gauge resistor utilizing a piezoresistance of a semiconductor diffused resistor mounted on a diaphragm, a semiconductor pressure sensor chip having a diaphragm configuration provided with a diffused resistor for adjusting an offset voltage and mounted on a place outside of the diaphragm, a substrate for mounting the pressure sensor chip thereon, a chip portion having a pipe for introducing a pressure medium onto the surface of the sensor and a housing for protecting the pressure sensor mechanically. The unit is further constructed in such a way that all of the input and output terminal and the offset voltage adjusting terminals of the pressure sensor chip are withdrawn from the substrate outside of the cap portion and each of the terminals is electrically connected to an electrical source selectively enabling adjustment of the offset voltage, and a separate resistor for limiting the input current into the pressure sensor chip is mounted on the substrate.

The precise construction of this embodiment will be explained with reference to FIG. 4 through FIG. 6 hereunder.

Figure 4A:
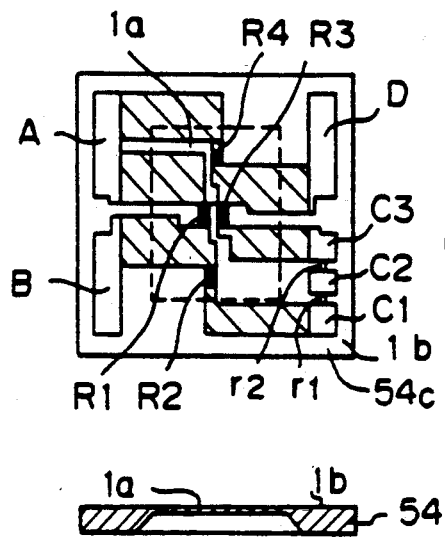
FIGS. 4A, 4B and 4C show one example of a pressure sensor chip used in the present invention.
Figure 4C:
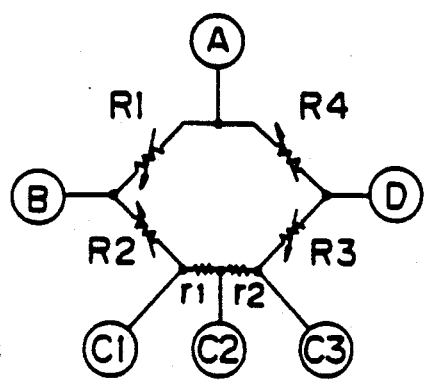
Figure 4B:

As seen in FIG. 4, a pressure sensor chip 54e having a diaphragm configuration 1a, and which converts the sensed pressure into an electrical signal utilizing a piezoresistance effect of a semiconductor diffused resistor is provided; and the gauge resistors $R_1$, $R_2$, $R_3$, $R_4$ are mounted on the surface of the diaphragm 1a and the diffused resistors $r_1$, $r_2$ for adjusting the offset voltage, are provided on the surface 1b outside of the diaphragm 1a.

In the pressure sensor chip 54C as mentioned above, the offset voltage thereof can be adjusted by selecting one of the terminals $C_1$, $C_2$ and $C_3$ because when the voltage or electric current is applied between the terminal A and any one or two of the terminals $C_1$, $C_2$ and $C_3$, the output thereof can be taken out from the terminals B and D.

Figure 5:
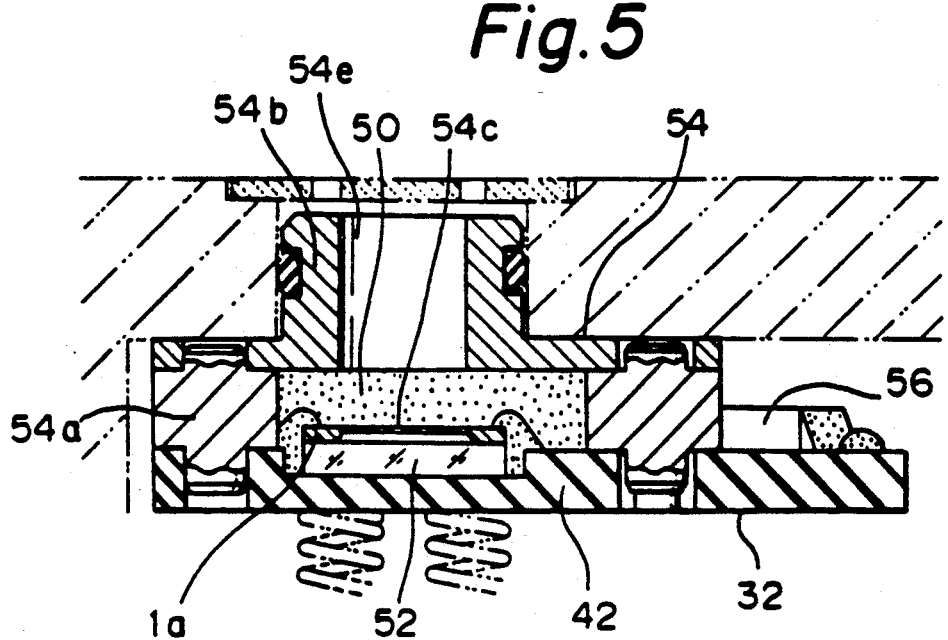
FIG. 5 is a cross sectional view of one example of a barometric pressure sensor mounted on a device according to the present invention.
Figure 6:
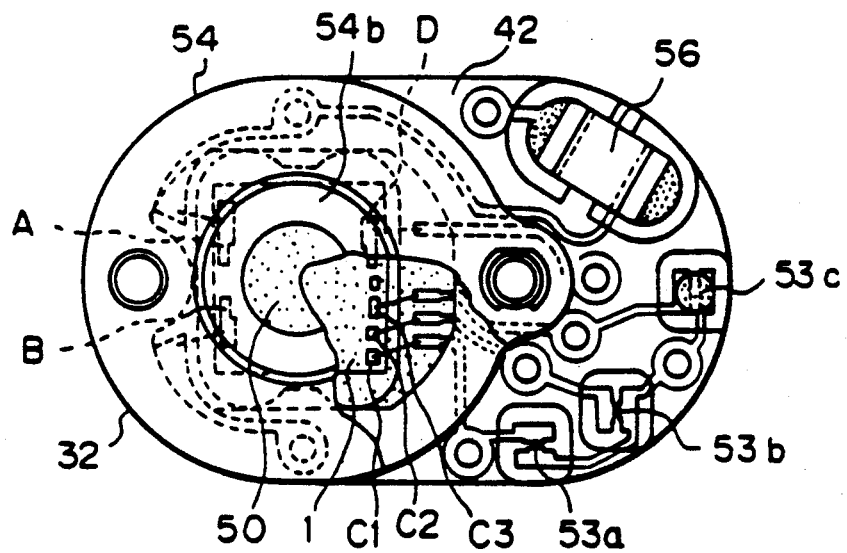
FIG. 6 is a plane view of one example of a barometric pressure sensor unit used in the present invention showing the sensor chip and other components used therein and the wiring method.

As shown in FIG. 5 and FIG. 6, the pressure sensor chip 54c is hermetically mounted on a mount 52 made of, for example, borosilicate glass of #7740.

While, in this embodiment, a sealing frame 54a and a cap portion 54b having a pipe 54e for introducing the pressure medium thereinto are provided, and a housing 54 for mechanically protecting the pressure sensor chip 54c, is composed of the sealing frame 54a and the cap portion 54b.

And further, a substrate 42, on which the pressure sensor chip 54c is mounted, is made of an epoxy resin including a glass therein, for example, or a ceramic material is provided, and after the mount 52, the pressure sensor chip 54c being fixedly mounted thereon, is fixed onto the substrate 42 with a suitable adhesive such as a silicon rubber or the like, and the input and output terminals A, B, and C of the pressure sensor chip 54c and the offset voltage adjusting terminals $C_1$, $C_2$ and $C_3$ are all electrically connected to the circuit pattern formed on the surface of the substrate 3 using a wire bonding method.

In FIG. 6, 53a, 53b and 53c are patterns provided on the substrate 42 and outside of the cap portion for connecting the output terminal of the offset voltage adjusting terminals $C_1$, $C_2$ and $C_3$ of the pressure sensor chip 54c and the negative terminal (−) of the electrical source of the pressure sensor unit 32 utilizing a soldering method or the like.

And further, a potting resin 50 which is gelatinous after being cured, is provided to serve as a mechanical and electrical protector for the pressure sensor unit 32 and to simultaneously work as a pressure medium.

In this embodiment, after the pressure sensor chip 54c and the substrate 42 are electrically connected using the wire bonding method, first the sealing frame 54a is fixedly mounted on the substrate 42, and thereafter the potting resin 50 is injected into the inner portion of the frame 54a.

Then, a defoaming operation is carried out on the potting resin by placing it in a vacuum atmosphere and thereafter the cap portion 54b is fixedly mounted on the frame 54a.

With the pressure sensor unit thus obtained, the sensitivity, the offset voltage and the impedance which are the basic characteristics of the pressure sensor, are measured by applying pressure to the sensor through the cap portion having a pipe for introducing the pressure thereinto.

The resistor 56 is selected depending upon the results obtained by measuring the sensitivity and the impedance thereof and is fixedly mounted between the terminals of the voltage source (+) and the $V_{DD}$ terminal using a soldering method and it serves to control the input current of the pressure sensor chip to absorb variations of the sensitivity and the impedance thereof.

On the other hand, the patterns 53a, 53b, and 53c formed on the surface of the substrate 42, depending upon the measured results of the offset voltage, are connected to the terminals of the voltage source (−) using the soldering method as a last step on making the pressure sensor unit 32.

In this invention, the pressure sensor unit 32 can be mounted on any portion of the substrate 42, and one embodiment of the arrangement thereof can be seen in FIG. 3 as a cross sectional view of its arrangement and in FIG. 7 as a plane view thereof.

EXAMPLE 2

Next, another example of the present invention belonging to the latter embodiment will be explained with reference to FIGS. 8, 10, and 11.

As explained above, in this embodiment both barometric pressure information and altitude information are processed and both are displayed on a display device simultaneously or alternately.

Figure 8:
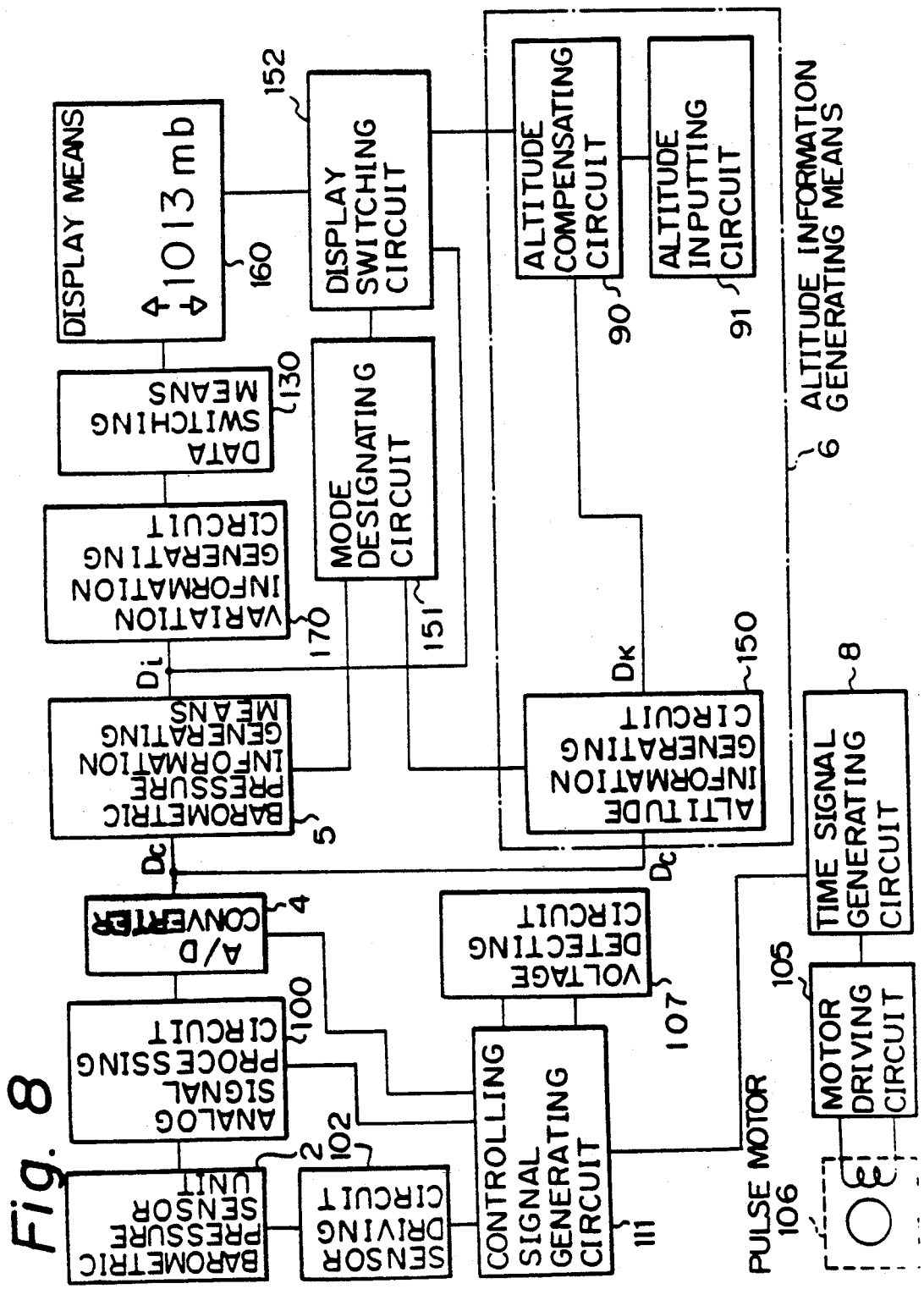
FIG. 8 is a block diagram of the circuitry of a second embodiment of the present invention.

FIG. 8 is a block diagram showing a basic composition of the second embodiment of the present invention mainly depending upon the composition shown in FIG. 1.

However, in this embodiment, the altitude information is only processed using the altitude compensation data but not using the temperature compensating circuit.

In FIG. 8, a specifically designed pressure information generating means 5 is separately provided in addition to the A/D converter 4 and the altitude information generating means 6, and further a mode designating circuit 151 is connected to the pressure information generating means 5 and the altitude information generating means 6 for switching to selectively connect one of those to the display device 160 through a display switching means 152, and a pressure variation information generating circuit 170 for generating information relating to variations in pressure based on the information data output from the pressure information generating means 5 and for displaying it on the display device 160 through a data display switching means 130, are provided.

On the other hand, the altitude information generating means 6 includes an altitude information generating circuit 150, an altitude compensating means comprising an altitude inputting circuit 91 and an altitude compensating circuit 90.

Both of these circuits operate in the same manner as described in Example 1.

In addition, this embodiment further comprises a control signal generating circuit 111 actuated by a signal output from a time signal generating circuit 8 driven by a motor driving circuit 105 with a pulse motor 106 and it is connected to the pressure sensor 2 through a pressure sensor driving circuit 102 and the A/D converter 4. Note, that this kind of control circuit is also provided in Example 1.

And, if necessary, a voltage detecting circuit 109 may be connected to the control signal generating circuit 111.

Hereafter, a more detailed explanation of this embodiment will be given with reference to FIG. 10.

Figure 10C:
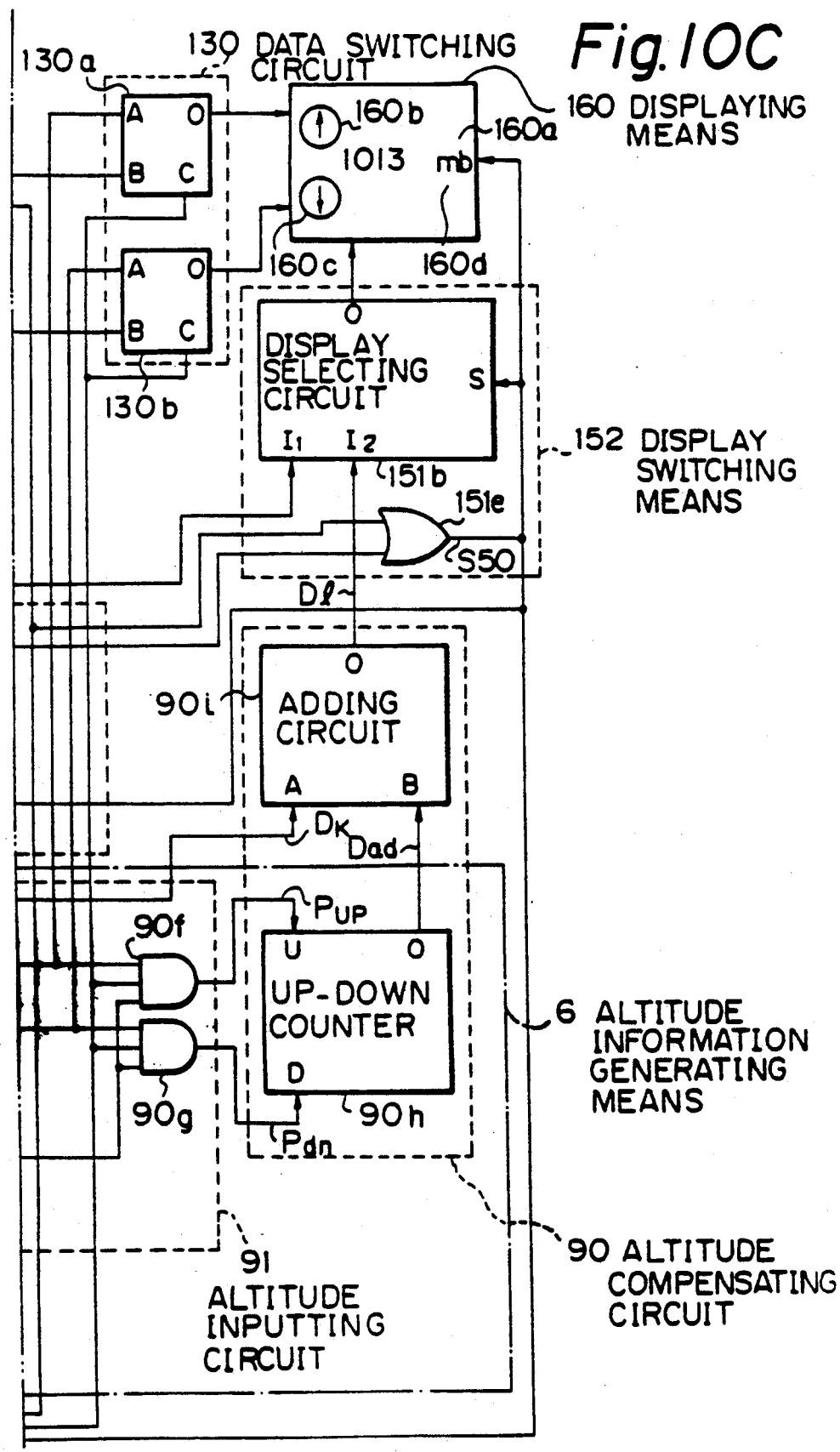

In FIG. 10, reference numeral 2 denotes a barometric pressure sensor for outputting a barometric pressure signal $S_1$ proportional to a barometric pressure P which converts the pressure thus obtained into an electrical signal utilizing a pressure sensor made of a semiconductor 102, a driver for supplying a constant current to the atmospheric pressure sensor 2 to drive it; 103, an amplifier for amplifying the atmospheric pressure signal $S_1$; and 108, a sample-and-hold circuit for holding the barometric pressure signal. The sample-and-hold circuit 108 is constituted a buffer amplifier 81 for outputting an amplified barometric pressure signal $S_1'$, a transmission gate (TG) 82 serving as an analog switch, a buffer amplifier 83, and a capacitor 84 for holding a signal. The amplifier 103 and the sample-and-hold circuit 108 constitute an analog signal processor 100.

Reference numeral 4 denotes an A/D converter for A/D converting a signal $S_1''$ output from the sample-and-hold circuit 108 and outputting the signal as converted data $D_c$; and 5, a pressure information generating means, that is a first sensor information data processor for processing the converted data $D_c$ output from the A/D converter 4, to convert the data into sensor information data $D_i$ i.e., pressure information. The pressure information generating means 5 is constituted by a memory setting circuit 105a, a first memory (A) 105b, a second memory (B) 105c, a data selector 105d, and a microcomputer 105e serving as a sensor characteristic equation calculating means.

The memory setting circuit 105a receives the converted data $D_c$ from the A/D converter 4 at its terminal I and outputs the data from its terminal $O_1$ or $O_2$ in accordance with a control signal $S_{31}$ or $S_{32}$ externally input to its terminal $C_1$ or $C_2$. The memory (A) 105b or memory (B) 105c stores the data.

When the converted data $D_c$ is output from the terminal $O_1$ of the memory setting circuit 105a, it is stored as memory data $D_a$ in the memory (A) 105b. When the converted data $D_c$ is output from the terminal $O_2$, it is stored as memory data $D_b$ in the memory (B) 105c. Note that the memories (A) 105b and (B) 105c are nonvolatile memories and therefore their contents once stored by the memory setting circuit 105a are kept therein even if the power source is cut off.

In accordance with a control signal from the microcomputer 105e, the data selected 105d selectively outputs, from its terminal O, the converted data $D_c$ input to its terminal $I_1$, the memory data $D_a$ which is a stored content of the memory (A) 105b and input to its terminal $I_2$, or the memory data $D_b$ which is a stored content of the memory (B) 105c and input to its terminal $I_3$, and supplies it to the microcomputer 105e.

The altitude information generating circuit 150 for converting the converted data $D_c$ output from the A/D converter 4 into sensor information data, i.e., altitude information $D_k$, is also provided in the altitude information generating means 6, and the construction thereof is the same as that of the pressure information generating means 5.

Namely, a memory setting circuit 150a, a first memory (E) 150b, a second memory (F) 150c, a data selecting circuit 150d and a microcomputer 150e corresponding to the memory setting circuit 105a, the first memory (A) 105b, the second memory (B) 105c, the data selecting circuit 105d and the microcomputer 105e of the pressure information generating means 5 respectively.

Reference numeral 8 denotes a time signal generating circuit 8 for generating a time signal S60 which becomes high in level (referred to as "H" hereinafter) for one second once an hour, and a time signal S70 which becomes "H" for 0.5 second once an hour in synchronization with the trailing edge of the time signal S60.

The time signal S60 is supplied to an OR circuit 151e of the display switching circuit 152, described later, and a control signal generating circuit 111 while the time signal S70 is supplied to a pressure variation information generating circuit 170.

As mentioned above, in this embodiment, a mode selecting circuit 151 for selectively designating either a pressure measuring mode in which the pressure information generating means 5 is actuated, or an altitude measuring mode in which the altitude information generating means 6 is actuated, is provided.

The mode selecting circuit 151 comprises at least a data switching circuit 151a, a flip-flop circuit 151c, pull down resistor 151d, an inverter 151f and a pressure-altitude selecting switch SW2.

In this mode selecting circuit 151, when the pressure-altitude selecting switch SW2 is OFF, a signal having "L" level (reference to as "L" hereinafter) caused by the pull down resistor 151d, is applied to the input terminal of the inverter 151f while when the pressure-altitude selecting switch SW2 is ON, the signal having "H" level is applied to the input terminal of the inverter 151f.

On the other hand, in the display switching circuit 152, a data selecting circuit 151b and an OR circuit 151e are provided and the output signal output from the flip-flop 151c caused by the input signal input to the terminal $\phi$ from the inverter 151f, is applied to one of the input terminals of the OR circuit 151e while the time signal S60 generated from the time signal generating circuit 8 is applied to the other input terminal thereof to output the pressure measuring signal S50 at the output terminal of the OR circuit 151e.

The data switching circuit 151a in the mode selecting circuit works in such a manner that when the pressure measuring signal S50 output from the OR circuit 151e, and input to the input terminal S thereof, is "H", i.e., at the time of measuring the pressure, outputs the signal S8 indicating the completion of the A/D conversion from the terminal $O_1$ with a switching operation, while when the pressure measuring signal S50 input to the input terminal S thereof, is "L", i.e., at the time of measuring the altitude, it outputs the signal S8 indicating the completion of the A/D conversion from the terminal O$_2$ with a switching operation.

On the other hand, the data selecting circuit 151b in the display switching circuit 152, selectively outputs the pressure information signal D$_i$ input to the terminal I$_1$ thereof from the terminal O when the pressure measuring signal S50 applied to the input terminal thereof is "H", i.e., at the time of measuring the pressure, and outputs the altitude information signal D$_L$ input to the terminal I$_2$ thereof from the terminal O when the pressure measuring signal S50 is applied to the input terminal thereof is "L", i.e., at the time of measuring the altitude.

Reference numeral 107 denotes a voltage detecting circuit for detecting the terminal voltage V$_{dd}$ of a battery, not shown, and it works in such a manner that when a sampling signal S4 is input thereto it outputs a discrimination signal of the voltage of the battery S5, being "L" in the case of the terminal volta V$_{dd}$ of a battery beyond the desired value V$_{sen}$, while being "H" in the case of the terminal voltage V$_{dd}$ being below that value.

The specific embodiment of the voltage detection circuit shown in the specification of U.S. patent application Ser. No. 07/168,728, assigned by the same assignee of this application, may be used as this voltage detecting circuit.

The pressure variation information generating circuit 170 for processing the two groups of data measured from the output of the pressure information generating means 5, and determining from the pressure variation information whether the pressure is increasing or decreasing, is provided and comprises a latch circuit 170a and a comparator 170b.

To both the input terminal of the latch circuit 170a and the terminal A of the comparator 170b, the pressure information signal D$_i$ and the output of the pressure information generating means 5 are input respectively, while the pressure information D'$_i$ representing the pressure information which was latched one hour previously in the latch circuit corresponding to the time signal S70 output from the time signal generating circuit 8, has been input to the terminal B of the comparator 170b.

Therefore, when the current pressure information D$_i$ exceeds pressure information D'$_i$ representing the pressure information one hour previously, an output signal S$_{h1}$ indicating the increment of the pressure is output from the output terminal O$_1$ of the comparator 170b and input to the terminal B of the data switching circuit 130a of the data switching means 130 described later, while when the current barometric pressure information D$_i$ is below the pressure information D'$_i$ representing the pressure information one hour previously, an output signal S$_{h2}$ indicating the decrement of the pressure is output from the output terminal O$_2$ of the comparator 170b and input to the terminal B of the data switching circuit 130b of the data switching means 130.

Returning to the altitude information generating means 6, an altitude information generating circuit 150, an altitude compensating information inputting circuit 91, and an altitude compensating circuit 90 are provided in this circuit and this construction corresponds to that shown in FIG. 8.

In this circuit, the altitude compensating circuit 90 compensates the data measured in the altitude information generating circuit 150 with the data generated from the altitude compensating information inputting circuit 91 and comprises an up-down counter 90h and a summing circuit 90i, while the altitude compensating information inputting circuit comprises a pull down resistor 90a and 90c, a buffer 90b, an inverter 90d, flip-flop 90e, AND circuits 90f and 90g, a compensating switching switch SW3, and an altitude compensating switch SW4.

In these circuits, when the compensating switching switch SW3 is OFF, a signal "L" caused by the pull down resistor 90c is applied to the input terminal of the inverter 90d, and while the switch SW3 is ON, a signal "H" is applied to the input terminal of the inverter 90d.

The output signal of the inverter 90d is then applied to the terminal φ of the flip-flop 90e whereby the output signal output from the terminal Q of the flip-flop 90e is applied to one of the input terminals of the AND circuit 90f, and is further applied to the terminal A of the data switching circuit 130a in the data switching means 130, while the output signal output from the terminal Q" of the flip-flop 90e is applied to one of the input terminals of the other AND circuit 90g, and is further applied to the terminal A of the data switching circuit 130b in the data switching means 130.

When the altitude compensating switch SW4 is OFF, a signal "L" caused by the pull down resister 90a is applied to the input terminal of the buffer 90b, and while the switch SW4 is ON, a signal "H" is applied to the input terminal of the buffer 90b.

The output signal from the buffer 90b is applied to the other input terminal of the AND circuit 90f and 90g, while a compensating mode signal S$_{h0}$ output from the controlling signal generating circuit 111 is applied to the rest of the input terminals of the AND circuit 90f and 90g.

The output of the AND circuit 90f is applied to the up-input terminal U of the up-down counter 90h and the output of the AND circuit 90g is applied to the down-input terminal D of the up-down counter 90h, and thereafter altitude compensating data D$_{ad}$ output from the up-down counter 90h is applied to the input terminal B of the summing circuit 90i.

On the other hand, altitude information data D$_k$ output from the altitude information generating circuit 150 is input to the other input terminal A of the summing circuit 90i, and altitude information D$_L$ after compensation in a manner as described above, is output from the output terminal O of the summing circuit 90i for input to the terminal I$_2$ of the data selecting circuit 151b of the display switching circuit 152.

In this embodiment, a display device 160 is provided to display pressure and/or altitude depending on the output data output from the terminal O of the data selecting circuit 151b corresponding to the pressure information data Di and the altitude information data D$_L$.

Figure 12:
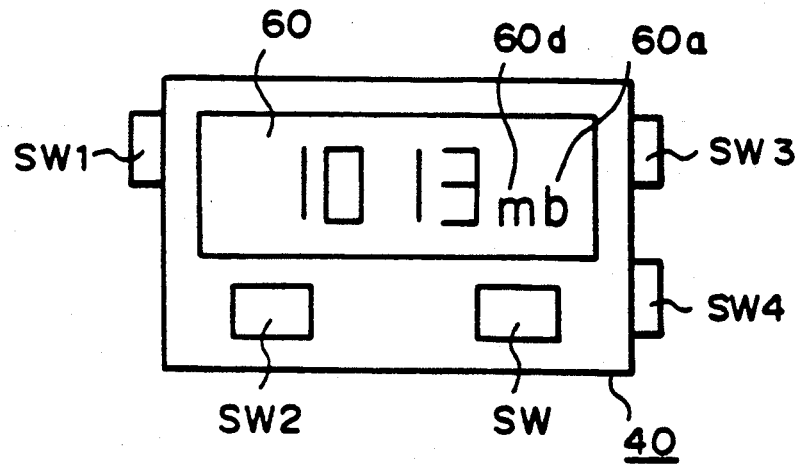
FIG. 12 is a plane view of one example of the device of the present invention showing a display means and several switches.
Figure 13A:
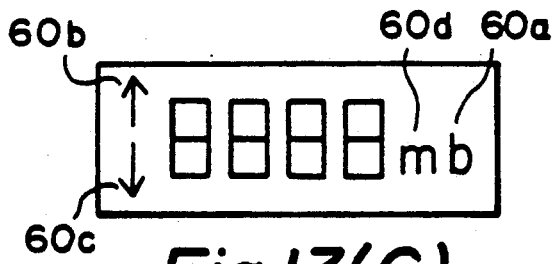
FIGS. 13A-13F show the display modes indicating information about barometric pressure and altitude in the display means of the present invention.
Figure 13B:
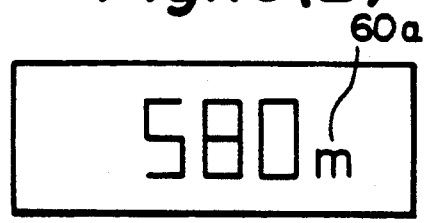
Figure 13C:
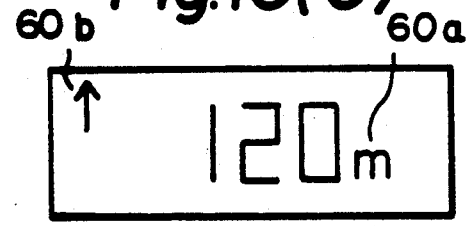
Figure 13D:
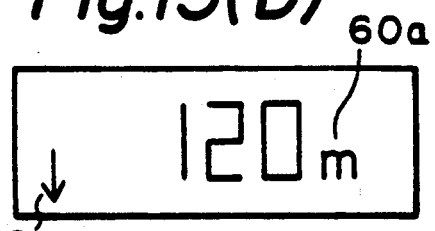
Figure 13E:
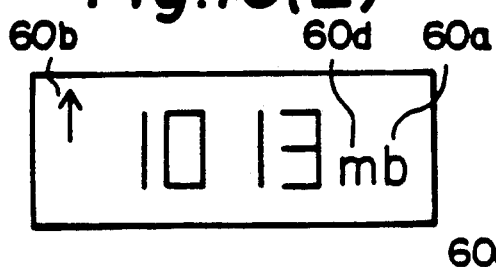
Figure 13F:
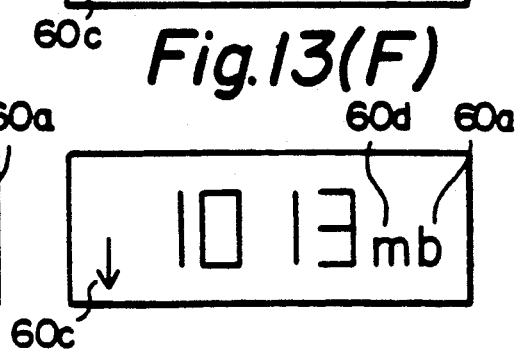

In this display device, as shown in FIGS. 10, 12 and 13, a mark m 160d representing a unit of height in meters and the First letter of the word millibar, a mark b 160a representing the first letter of the word bar, a unit of pressure, a variation display mark 160b commonly indicating both the condition of increased pressure and the condition of the altitude being compensated by a summing operation, and a variation display mark 160c commonly indicating both the condition of decreased pressure and the condition of the altitude being compensated by a subtracting operation, and further in FIG. 13A, a condition in which all of the display components of the display device 160 are turned ON to be illuminated is shown; and each FIG. 13B, 13C, 13D, 13E, and 13F shows the condition of the display device 160 displaying the altitude, the altitude compensated by the summing operation, the altitude compensated by the subtracting operation, the pressure when there is a pressure increment and the pressure when there is a pressure decrement, respectively.

The compensating mode signal $S_{HO}$ is input to both of the terminal SC of the data switching circuits 130a and 130b of the data switching means 130, and the output terminal O of the data switching circuit 130a and the output terminal O of the data switching circuit 130b are connected to the variation display marks 160b and 160c respectively.

This circuit operates in a manner such that when the compensation mode signal $S_{HO}$ is "L", either the existence of an increment in pressure or a decrement in pressure is displayed, while when the compensating mode signal $S_{HO}$ is "H", either the condition of the altitude being compensated by a summing operation or the altitude being compensated by a subtracting operation is displayed.

Hereinafter, the control signal generating circuit 111 used in this embodiment will be explained more precisely.

An electrical voltage discriminating signal of the battery S5, the signal of the completion of A/D conversion S8, the pressure measuring signal S50, and the time signal S60 are input to the control signal generating circuit 111, and the sensor controlling signal S6, the sampling signal S2, S4, the A/D conversion command signal S7, and compensation mode signal $S_{HO}$ are output therefrom.

The operation of the circuit 111 is actuated when the starting switch SW is ON, and the operation of each component in this circuit will be explained with reference to FIG. 11.

The controlling signal generating circuit 111 comprises an oscillator 111a for generating a reference signal (e.g., 323768 Hz), a frequency divider 111b for dividing a frequency of the reference signal at a predetermined division ratio, and AND gate circuits 111c and 111d, OR gate circuits 111e, 111f, 111g, 111k, and 111v, a NOR gate circuit 111y, positive edge set/reset flip-flops (referred to as PESR-FFS hereinafter) 111h, 111i, and 111j, an inverter 111l, negative going type flip-flop (referred to as NE-FFs hereinafter) 111x and 111z, a pull down resistor 111w, the starting switch SW and the measuring mode selecting switch 120; for logically processing the frequency-divided signals having a different frequencies from each other, output from output terminals $Q_7$, $Q_8$, $Q_9$, $Q_{15}$ and $Q_{16}$ of the frequency divider 111b, and the signal of the completion of A/D conversion S8, the pressure measuring signal S50, the battery voltage discriminating signal S5, and the time signal S60.

An output terminal Q of each of the PESR-FFs 111h, 111i and 111j goes to "H" at a leading edge of a signal input to a set terminal S and goes to "L" at a leading edge of a signal input to a reset terminal R.

The AND gate circuit 111c ANDs the outputs from the output terminals $Q_7$ and $Q_9$ of the frequency divider 111b, and outputs a signal Pr.

The AND gate circuit 111b ANDs an output from the terminal Q of the PESR-FF 111h and outputs from the output terminals $Q_7$ and $Q_8$ of the frequency divider 111b, and generates a sampling signal $S_2$.

The OR gate circuit 111k then ORs the battery voltage discriminating signal S5 and the output signal $S_{ff}$ output from the NE-FF 111z to generate the reset signal $S_{re}$.

The OR gate circuit 111e then ORs the output signal from the AND gate circuit 111c and the reset signal $S_{re}$ while the OR gate circuit 111f ORs the output signal from the output terminal $Q_8$ of the frequency divider 111b and the reset signal $S_{re}$.

The set terminal S of the PESR-FF 111h is connected to the output terminal $Q_{15}$ of the frequency divider 111b and the reset terminal R thereof is connected to the output terminal of the OR gate circuit 111e to output the sensor control signal S6 from the output terminal Q.

The set terminal S of the PESR-FF 111i is connected to the output terminal Q of the PESR-FF 111h and the reset terminal R thereof is connected to the output terminal of the OR gate circuit 111f to output the sampling signal S4 for the battery voltage discriminating circuit 107.

The reset terminal S of the PESR-FF 111j is connected to the output terminal Q of the PESR-FF 111h through the inverter 111l and the reset terminal R thereof is connected to the output terminal of the OR gate circuit 111g to output the A/D conversion command signal S7 from the output terminal Q thereof.

The measuring mode selecting means 120 is a means for selectively designating either a brief operating mode in which the measuring operation is carried out briefly, or a continuous operating mode in which the measuring operation is carried out continuously by controlling the altitude information generating means 6 and the pressure information generating means 5 as the sensor information data processing means with an external operating device, and comprises a mode selecting switch SW1, a pull down resistor 120d, an NE-FF 120a, an OR gate circuit 120c, an AND gate circuit 120b and an inverter 120e.

In this circuitry, when the mode selecting switch SW1 is OFF, the signal "L" caused by the pull down resistor 120d is applied to the terminal φ of the NE-FF 120a indicating the continuous measuring mode, while when the mode selecting switch SW1 is ON, the signal "H" indicating the brief measuring mode, is applied to the terminal φ of the NE-FF 120a.

On the other hand, the output signal from the output terminal Q of the NE-FF 120a, the output signal output from the output terminal Q of the NE-FF 111x, and the time signal S60 output from the time signal generating circuit 8 are input to the OR gate circuit 120c; and the output thereof is applied to one of the inputs of the AND gate circuit 120b, while the signal output from the output terminal $Q_{16}$ of the frequency divider 111b is input to the other input terminal of the AND gate circuit 120b to output a brief mode ending signal $S_{ts}$ from the output thereof.

When the starting switch SW is OFF, the signal "L" caused by the pull down resistor 111w is applied to one of the input terminals of the NOR gate circuit 111y, when the starting switch SW is ON, the signal "H" is applied to the same terminal of the NOR gate circuit 111y.

The time signal S60 output from the time signal generating circuit 8 is then applied to the rest of the terminals of the NOR gate circuit 111y.

Further, the signal output from the NOR gate circuit 111y is applied to the terminal φ of the NE-FF 111z, and the brief mode ending signal $S_{ts}$ is applied to the set terminal S thereof, and the measuring signal $S_{ff}$ is output from the output terminal Q of the NE-FF 111z.

The measuring signal $S_{ff}$ is applied to the terminal $\phi$ of the NE-FF 111x and the output of the OR gate circuit 111v to which the pressure measuring signal S50 and the time signal S60 output from the time signal generating circuit 8 are input, is input to the reset terminal R thereof.

The compensating signal $S_{h0}$ is then output from the output terminal Q of the NE-FF 111x.

The schematic configuration of the device for measuring the pressure and the altitude of the embodiment described above is shown in FIG. 12.

Next, the operation of the device for measuring pressure and altitude according to the present invention will be described with the operation of the control signal generating circuit 111, and with reference to FIGS. 14 to 16.

The basic method for displaying pressure has already been shown in the previously mentioned specification for patent application in the U.S. under the Ser. No. 07/168,728 by the same assignee as this application, therefore, the method of displaying altitude in the present invention will be explained first.

First, assuming a condition in which the pressure measuring signal S50 of the OR gate circuit 151e in the display switching circuit 152 is "L".

The timing chart of the control signal generating circuit 111 when the output of the OR gate circuit 120c of the measuring mode selecting means 120 is "H", i.e., the measuring mode is set in the brief measuring mode, is disclosed.

Figure 14:
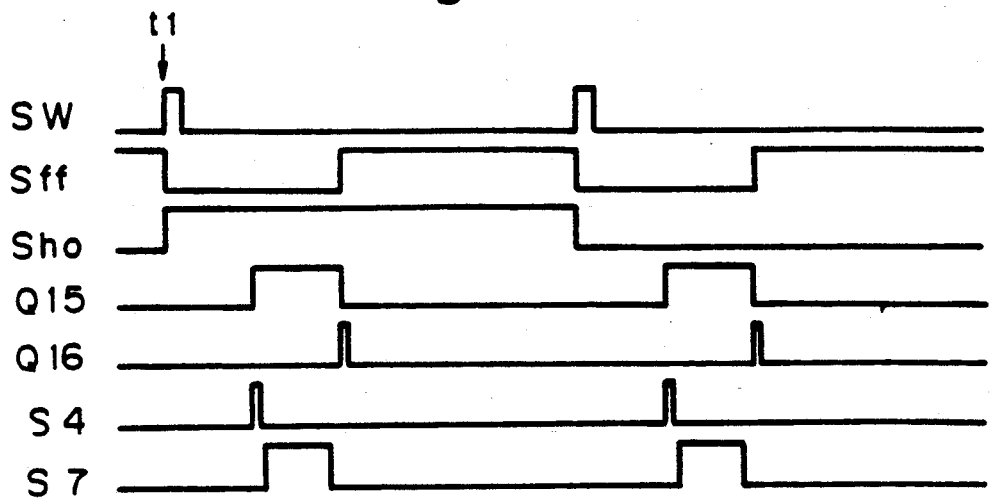
FIG. 14 shows a signal timing chart with the mode set in the brief measuring mode by the measuring mode selecting means.
Figure 17B:
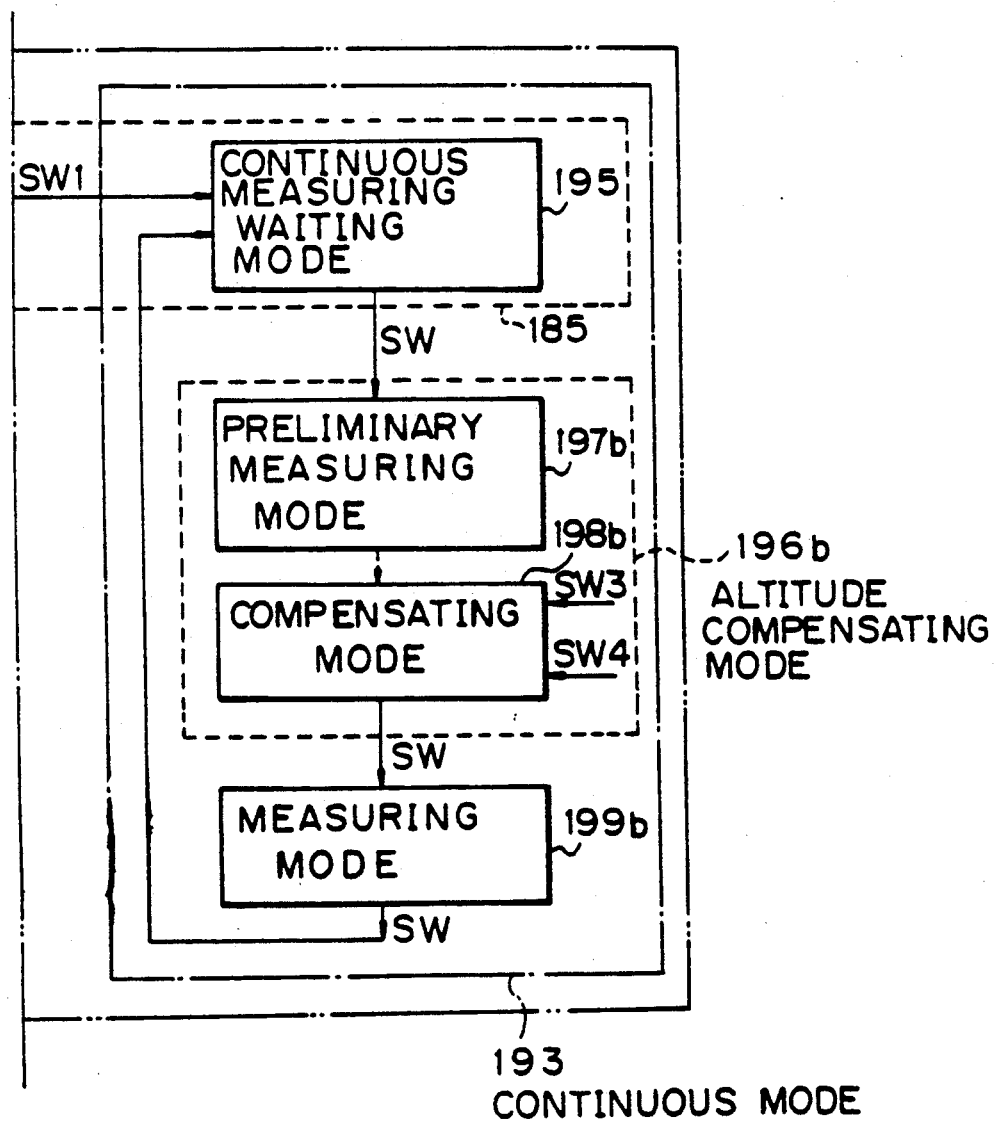

As is apparent from FIG. 14, when the time signal S60 which is "H" once an hour is "L", and the starting switch SW of the control signal generating circuit 111 is OFF, the output of the NOR gate 111y is "H" causing the measuring signal $S_{ff}$ output from the NE-FF 111z to change to "H", and thus the reset signal $S_{re}$ output from the OR gate 111k is applied to the frequency divider 111b and each PESR-FF 111h, 111i, and 111j to reset all of these circuits changing all of the sampling signals S2, S4, the sensor controlling signal S6, and A/D conversion command signal S7 to "L" thereby entering the brief measuring mode 194 as shown in FIG. 17.

In the brief measuring mode condition 194, when the starting switch SW is turned ON at the time t1, the mode changes to the preliminary measuring mode 197a in the altitude compensating mode 196a as shown in FIG. 17; and thereby the output signal output from the terminal Q of the NE-FF 111z changes from "H" to "L" and consequently, the reset signal $S_{re}$ output from the OR gate 111k is changed to "L" causing release of the reset of the frequency divider 111b to start the dividing operation.

Figure 16:
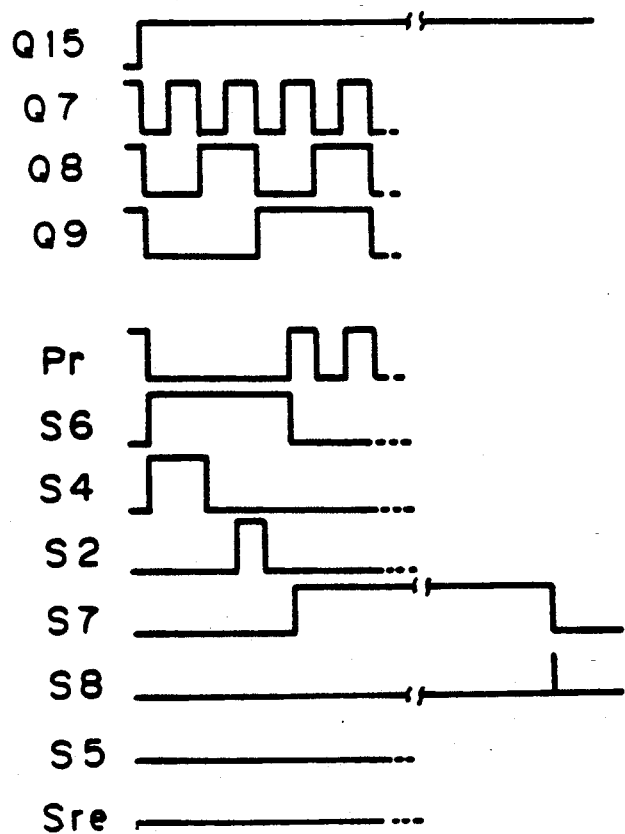
FIG. 16 shows a signal timing chart in a condition of the control signal and the battery voltage exceeding the detected voltage.

The frequency divider 111b outputs frequency-divided signals as shown in FIG. 16 from its output terminals $Q_7$, $Q_8$, $Q_9$, and $Q_{15}$. When "H" is output from the output terminal $Q_{15}$ of the frequency divider 111b 0.5 second after the start switch SW is turned ON (FIG. 16), the PERS-FF 111h is set and outputs the sensor control signal S6 of "H" from the output terminal Q. This sensor output signal S6 goes to "L" when both the outputs from the output terminals $Q_7$ and $Q_9$ of the frequency divider 111b go to "H".

When the sensor control signal S6 goes to "H", the PRES-FF 111i is set and outputs the sampling signal S4 of "H" as shown in FIG. 16 from the output terminal Q. This sampling signal S4 goes to "L" when the output from the output terminal $Q_8$ of the frequency divider 111b goes to "H".

When the outputs from the output terminals $Q_7$ and $Q_8$ of the frequency divider 111b go to "H" while the sensor control signal S6 is at "H", the sampling signal S2 of "H" is output. A duration of the sampling signal S2 is equal to that of an "H" output from the output terminal $Q_7$ of the frequency divider 111b and is determined in consideration of a time required for a sample-and-hold operation.

When the sensor control signal S6 is switched from "H" to "L", the PRES-FF 111j is set, and outputs the A/D conversion command signal S7 of "H" from the output terminal Q. This A/D conversion command signal S7 goes to "L" when A/D conversion is ended, and the A/D converter 4 outputs the A/D conversion end signal S8.

On the other hand, when the starting switch SW of the control signal generator 111 is turned ON, the sampling signals S2 and S4, the sensor control signal S6, and the A/D conversion command signal S7 are output at the timings described above. As a result, a constant current flows from the sensor driving circuit 102 to the pressure sensor 2, and the pressure sensor 2 outputs the barometric pressure signal S1 proportional to an barometric pressure applied thereon. The barometric pressure signal S1 is amplified by the amplifier 103 and supplied to the sample-and-hold circuit 8 as the signal $S_1'$.

In the sample-and-hold circuit 108, since the TG 82 is enabled when the sampling signal S2 is supplied thereto, the amplified pressure signal $S_1'$ supplied from the buffer amplifier 81 is passed through the TG 82, and the capacitor 84 is charged up to a voltage equal to a voltage level of the signal $S_1'$. An enabled time internal of the TG 82, i.e., the duration of the sampling signal S2 is sufficient for performing the sample-and-hold operation. Thereafter, even if the TG 82 is disabled, the capacitor 84 maintains the charged voltage level and outputs the pressure signal $S_1''$ thus held through the buffer amplifier 83.

As shown in FIG. 16, the control signal generator 111 outputs the A/D conversion command signal S7 when the sensor control signal S6 is switched from "H" to "L". As a result, the A/D converter 4 converts the pressure signal $S_1''$ output from the sample-and-hold circuit 8 into the digital converted data $D_c$.

The converted digital data $D_c$ is further converted into the pressure information signal $D_j$ and the altitude information signal $D_k$ in the pressure information generating means 5 and the altitude information generating circuit 5, these being the sensor information processing means.

Next, the method for calculating the characteristic equation of the sensor used in this sensor information processing means will be explained.

Note that the characteristic equation of the sensor can be used both in the pressure information generating means 5 and the altitude information generating circuit 5.

First, while a known barometric pressure P3 is applied to the barometric pressure sensor 2, the control signal S31 is externally input to the terminal $C_1$ of the memory setting circuit 105a and the converted data $D_c$ output from the A/D converter 4 is stored in the memory (A) 105b. Then, while a known pressure P4 different from the known pressure P3 is applied to the pressure sensor 2, the control signal S32 is input to the terminal $C_2$ of the memory setting circuit 105a, and the converted data $D_c$ output from the A/D converter 4 is stored in the memory (b) 105c.

Figure 18:
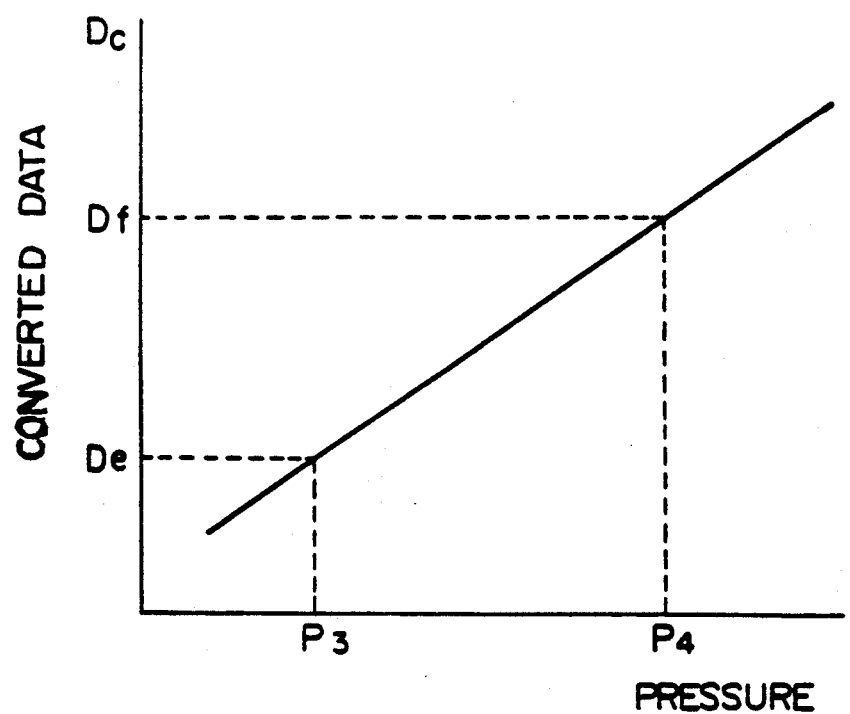
FIG. 18 shows a graph explaining the relationship between the physical information detected by the sensor information data processing circuit and the converted data therefrom.

That is, as shown in FIG. 18, the converted data $D_c$ obtained at the pressure $P_3$ is stored in the memory (A) 105b as the memory data $D_a$, and the converted data $D_c$ obtained at the barometric pressure $P_4$ is stored in the memory (B) 105c as the memory data $D_b$. In other words, total barometric pressure conversion characteristics of the characteristics of the analog signal processor 100 and those of the pressure sensor 2 are stored in the memories (A) 105 and (B) 105c.

The sensor characteristic equation calculation performed by the microcomputer 105e and the method for calculating altitude will be described below.

The microcomputer 150e in the altitude information generating circuit 150 controls the terminal C of the data selector 150d, reads the memory data $D_e$ (converted data $D_c$ at the pressure $P_3$) stored in the memory (E) 150b and the memory data $D_f$ (converted data $D_c$ at the pressure $P_4$) stored in the memory (F) 150c, and calculates $\epsilon$ and $\delta$, thereby determining the following sensor characteristic equation for determining the pressure information signal $D_p$.

$$D_p = \epsilon \times D_c + \delta \quad (5)$$

$$\epsilon = (P_2 - P_1)/(D_f - D_e)$$

$$\delta = P_3 - \epsilon \times D_e$$

Note that the determination of $\epsilon$ and $\delta$ of the above sensor characteristic equation need only be performed once when the power source is turned on in accordance with the memory data $D_e$ and $D_f$ stored in the nonvolatile memories.

The equation determined above can be used in both memory circuits in the altitude information generating circuit 6 and pressure information generating means 5.

Once the characteristic equation (5) of the sensor is determined, the pressure information signal $D_p$ indicating the pressure itself, can be calculated thereafter by reading the converted data $D_c$ into the microcomputer 150e through the data selecting circuit 150d.

The characteristic equation (5) of the sensor mentioned above is an equation for converting the converted data $D_c$ generated by the pressure P applied to the pressure sensor 2 into a pressure information signal. An explanation of how to calculate altitude from pressure using this equation will be described below.

As previously explained, altitude information can be obtained from equation (1) using the standard atmosphere as a model of the barometric pressure. Namely, altitude can be calculated from the converted data $D_c$ generated by the pressure P applied to the pressure sensor 2 using the equation (1) and it can be converted into the altitude information signal $D_k$.

Accordingly, in this invention, the equations (1) and (5) are previously stored in a suitable memory of the both the pressure information generating means 5 and the altitude information generating means 6, for example, a microcomputer 150e and 105e or the like.

Therefore, for example, when the digital converted data $D_c$ is input into the altitude information generating circuit 150 from the A/D converter 4, the sensor information signal, i.e., the altitude information signal $D_k$ processed in accordance with both equations (1) and (5), is output from the microcomputer 150e and is input into the summing circuit 90i in the altitude compensating means 90.

As mentioned above, in the brief measuring mode 194, when the starting switch SW of the control signal generating circuit 111 is ON, the mode is set to the preliminary measuring mode 197a in the altitude compensating mode 196a, and the sampling signal S2 and S4, the sensor control signal S6 and the A/D conversion command signal S7 are output with the timing mentioned above and thus the pressure signal S1 is converted into the altitude information signal $D_k$ processed in accordance with both equation (1) and the characteristic equation of the sensor (5), and input to the summing circuit 90i in the altitude compensating means after the preliminary measuring mode 197a is ended.

On the other hand, altitude processed by the equation (1) is obtained depending upon the relationship between the pressure and altitude and the standard atmosphere, and since that equation is only one model for calculating that relationship, when it is practically used to calculate altitude, the atmospheric pressure condition at that time and place will frequently be different from that of the model.

Accordingly, it is necessary that the altitude thus obtained be compensated for use as an altitude indicator.

In the brief measuring waiting mode condition 194, when the starting switch SW is turned ON, the mode is changed to the altitude compensating mode 196a causing the measuring signal $S_{ff}$ to be changed from "H" to "L" thereby changing the output signal from the terminal Q of the NE-FF 111x in the control signal generating circuit 111 to "H", i.e., the compensating mode signal $S_{HO}$ is "H".

Further, when the brief measuring mode ending signal $S_{ts}$ which is an output of the AND gate circuit 120b in the measuring mode selecting circuit 120, is "H", corresponding to the timing of the signal Q 16, which goes to "H" after 1 second from the time the switch SW is turned ON and the altitude is measured, the output of the output terminal Q of the NE-FF 111z is changed to "H", and thereby the reset signal $S_{re}$ is changed to "H" to disable the operation of the frequency divider 111b, causing the circuit to stop measuring the pressure.

In the brief measuring waiting mode condition 194, when the starting switch SW is turned ON, the mode is changed to the altitude compensating mode 196a causing the measuring signal $S_{ff}$ to be changed from "H" to "L", and thereby the output signal output from the terminal Q of the NE-F 111x in the control signal generating circuit 111 is "H", i.e., the compensating mode signal $S_{HO}$ is "H".

Namely, the preliminary measuring mode 197a is finished at this time.

This condition is the compensating mode 198a, in which the altitude compensating means 90 is actuated, and while the compensating mode signal $S_{HO}$ is "H", the inputting signals to the AND gate circuit 90f and 90g in the altitude compensating means 90 are allowed and therefore the altitude can be compensated utilizing the compensating switching means SW3 and the altitude compensating switch SW4 accordingly.

Each time the switch SW3 is turned ON by being pushed, each of the output signals at the output terminal Q and Q'' in the NF-FF 90e goes "H", and while the terminal Q is "H", a count up signal $P_{up}$ is input to the up-down counter 90h from the AND gate circuit 90f, in the altitude compensating information inputting circuit 91, each time the altitude compensating switch SW4 is pushed down.

Conversely, during the time when the terminal Q" is "H", a count down signal $P_{dn}$ is input to the up-down counter 90h from the AND gate circuit $90_g$ in the altitude compensating information inputting circuit 91 each time the altitude compensating switch SW4 is pushed down.

After the output data from the up-down counter 90h is applied to the summing circuit 90i, the altitude information $D_L$ obtained by compensating the output data from the up-down counter 90h, is output from the terminal O of the summing circuit 90i.

Thereafter, the altitude information $D_L$ input to the terminal I 2 of the data selecting circuit 151b in the display switching means 152 is output from the terminal O thereof and thereby the compensated altitude can be displayed on the display device 160.

In this situation, since the compensation mode signal $S_{HO}$ input to the terminal C of the data switching circuit 130a and 130b in the data switching means 130 is "H", the display thereof is switched to either the condition of altitude compensation being added or subtracted as shown in FIG. 13 (C) or (D), and either the variation displaying mark 60b or mark 60c is turned ON to display which compensation is being used.

In this embodiment, the variation displaying marks 60b and 60c are always turned ON, although it is probably preferable to flash the altitude display device or to flash the variation displaying marks 60b and 60c.

When the starting switch SW in the control signal generating circuit 111 is again turned ON as shown in FIG. 14, after the altitude compensation operation is finished, i.e., when the altitude compensation mode 196a is finished, the mode is changed to the measuring mode 199a in which the frequency divider 111b again starts calculating altitude because the output signal from the output terminal Q of the NE-FF 111z of the control signal generating circuit 111 is turned to "L".

Apparently, in this situation, as the compensated altitude data is stored in the adding circuit 90i in the altitude compensating means 90, the compensated altitude is displayed on the displaying device 160 as shown in FIG. 13 (B).

Further, in this situation, as the measuring signal $S_{ff}$, the output of the NE-FF 111z of the control signal generating circuit 111, is changed from "H" to "L", the output of output terminal Q of the NE-FF 111x is changed to "L" corresponding to the timing that caused the compensating mode signal $S_{HO}$ to be "L", and thereby the operation of the compensating switching switch SW3 and the altitude compensating switch SW4, in the altitude compensating information inputting circuit 91, are disabled to extinguish the variation displaying marks 60b and 60c as shown in FIG. 13 (B).

In this situation, the brief measuring mode ending signal $S_{ts}$ that is an output of the AND gate circuit 120b in the measuring mode selecting means 120, is changed to "H" corresponding to the timing of Q16, i.e., one second later, causing the output of the output terminal Q of the NE-FF 111z to be "H" whereby the reset signal $S_{re}$ is changed to "H" and therefore, the operation of the frequency divider 111b is disabled leading the altitude measuring operation in the brief measuring mode to be completed and to be changed to the brief measuring waiting mode condition 194.

Figure 15:
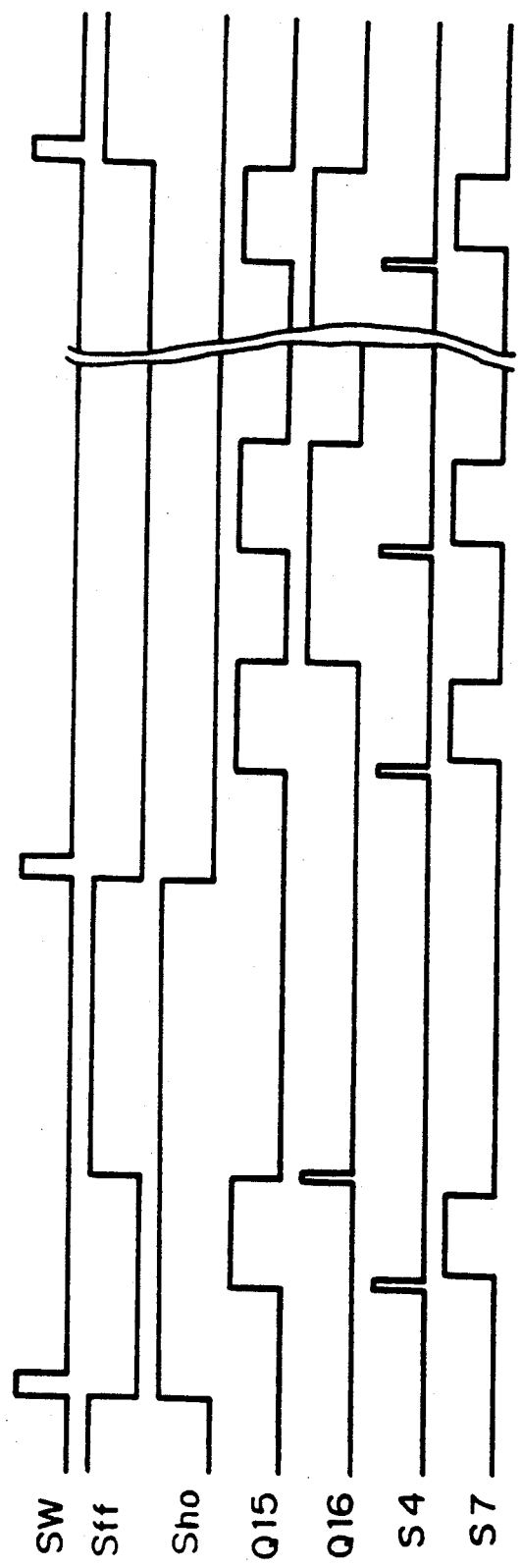
FIG. 15 shows a signal timing chart with, the mode set in the continuous measuring mode by the measuring mode selecting means.

In FIG. 15, the timing chart in which the output of the OR gate circuit 120c in the measuring mode selecting means 120 is "L", i.e., the continuous measuring mode is set, is disclosed.

The switching operation between the brief measuring mode and the continuous measuring mode is carried out by changing the output signal from terminal Q of the NE-FF 120a to either "H" or "L" every time the mode selecting switch SW1 is pushed down, as shown in FIG. 17, and therefore, when the continuous measuring mode is enabled, the output signal Q is "L".

In the continuous measuring mode, as in the brief measuring mode, when the starting switch SW of the control signal generating circuit 111 is turned ON in the continuous measuring waiting mode 195, the mode is changed to the altitude compensating mode 196b and the output of the output terminal Q of the NE-FF 111x of the control signal generating circuit 111 is changed to "H" as shown in FIG. 15 causing the compensating mode signal $S_{HO}$ is to be "H".

Further, the brief measuring mode ending signal $S_{ts}$, the output of the AND gate circuit 120b in the measuring mode selecting means 120 is changed to "H" after one second has passed since the switch SW was turned ON, because the output of Q16 in the frequency divider 111b is "H" and thereby the output of the output terminal Q of the NE-FF 111z is changed to "H".

As a result, the reset signal $S_{re}$ is changed to "H" causing the operation of the frequency divider 111b to stop, and thus the preliminary measuring mode 197b is completed, leading the mode into the compensating mode 198b, enabling the altitude compensating means 90 to operate.

In this situation, when the altitude is compensated and the switch SW is again turned ON as shown in FIG. 17, the measuring mode 199b is carried out, and the altitude measurement is started. Since the output of the OR gate circuit 120c is still "L", the measuring of the altitude can be carried out continuously, because the brief measuring mode ending signal $S_{ts}$ cannot be changed to "H", thus causing the output of the NE-FF 111z to be unchanged.

As shown in FIG. 17, when the starting switch SW is again turned ON, the output of the NE-FF 111z is changed to "H" causing the reset signal $S_{re}$ to be "H", whereby the operation of the frequency divider 111b is disabled, i.e., the continuous measuring waiting mode 195, to stop the measuring operation.

Next, the pressure information display method will be explained below.

As shown in FIG. 17, the case in which the pressure measuring signal S50 that is the output of the signal of the OR gate circuit 151e in the display switching means 152 is changed to "H" when the pressure-altitude selecting switch SW2 in the mode selecting circuit 151, is considered.

Figure 11:
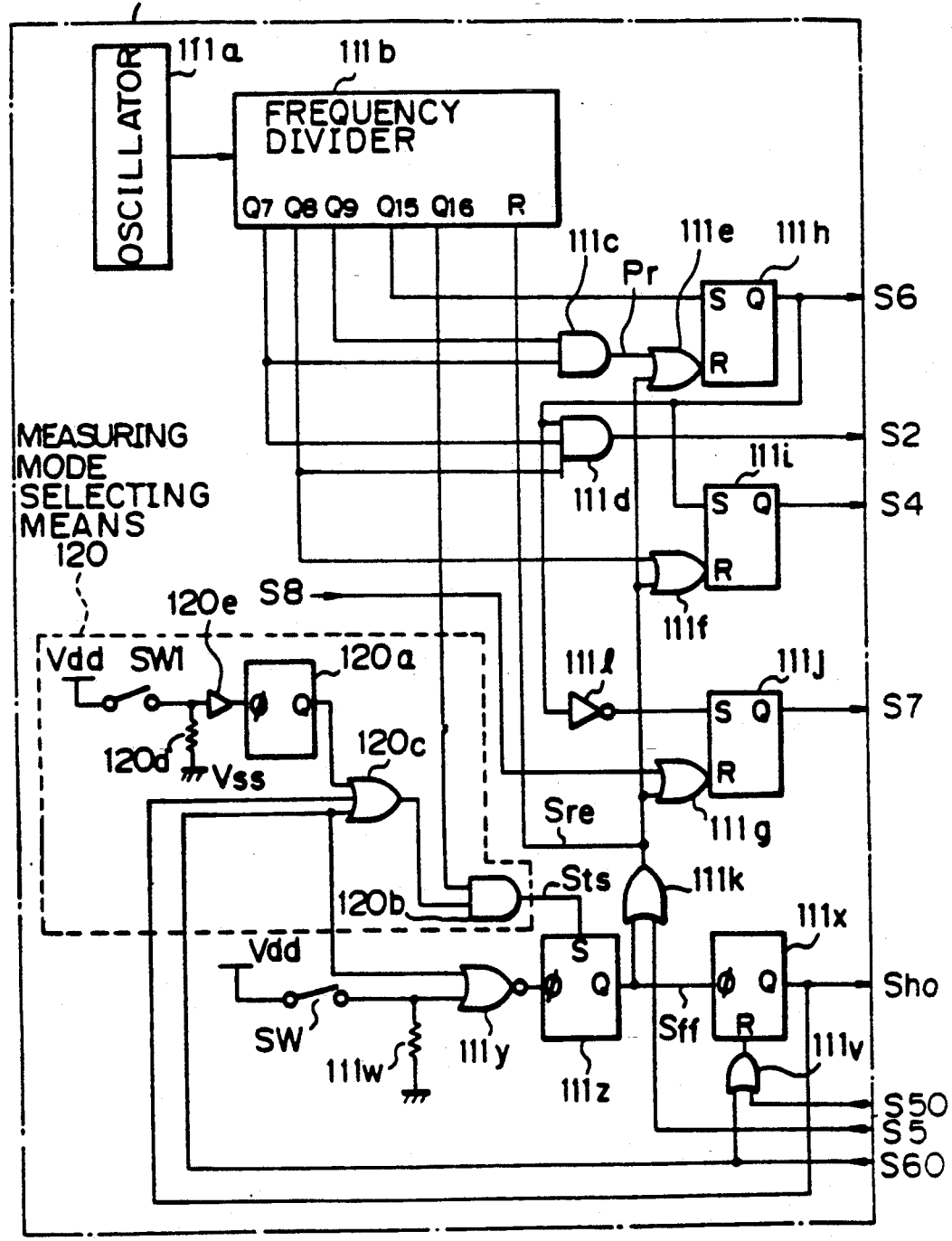
FIG. 11 is a block diagram of the control signal generating means used in the present invention.

When the pressure measuring signal S50 is "H", the output of the reset terminal R of the NF-FF 111x in the control signal generating circuit 111 is always "H" corresponding to the pressure measuring signal S50 as shown in FIG. 11 therefore the compensating mode signal $S_{HO}$ is "L".

When the starting switch SW is turned ON in the pressure measuring waiting mode 182, as with the timing mentioned above, the sampling signal S2 and S4, the sensor control signal S6, and A/D conversion command signal S7 are output, and thereby the pressure information generating means 5 is started because the A/D conversion ending signal S8 is supplied to the microcomputer 105e through the data switching circuit 151a.

The data thus input into the microcomputer is converted into the pressure information signal $D_i$ by processing it in accordance with the equation mentioned above, and the pressure information signal $D_i$ thus processed is input to the terminal I 1 of the data selecting circuit 151b.

At this time, since the "H" signal of the pressure measuring signal S50 is applied to the terminal S of the data selecting circuit 151b in the display switching means 152, the presence information signal $D_i$ input to the terminal I 1 thereof is output from the output terminal O thereof to display it on the displaying device 160.

While, the pressure measuring signal S50 is applied to this displaying device 160 as mentioned above and thereby both of the displaying segments "b" 160a and "m" 160d are illuminated so that the unit "mb" relating to atmospheric pressure can be seen with the value of the pressure as shown in FIG. 13.

As shown in FIG. 17, in the device for measuring pressure and altitude of the present invention, the pressure measuring mode 180 and the altitude measuring mode 190 are provided for operation by some suitable program and either one of these modes can be selected by operating the pressure and altitude selecting switch SW2, and further, the pressure measuring mode 180 comprises a pressure measuring waiting mode 182 and the pressure measuring mode 183 and while the altitude measuring mode 190 comprises a brief measuring mode 192 and a continuous measuring mode 193, each of which further comprise three different modes consisting of a measuring waiting mode 185, an altitude compensating mode 196, and a measuring mode 199.

Either one of these two modes in the altitude measuring mode 190 can be selected by operation of the mode selecting switch SW1.

The altitude measuring mode 190 further comprises a preliminary measuring mode 197 and a compensating mode 198.

The operation of the brief measuring mode 192 in this invention will be explained below.

First, in the brief measuring waiting mode 194, when the starting switch SW is turned ON, the mode is changed to the preliminary measuring mode 197a of the altitude compensating mode 196a, and in this mode, as mentioned above, the measuring of the altitude is carried out one time to generate preliminary altitude information, and that information is displayed on the displaying device 160, and the mode is simultaneously changed to the compensating mode 198a.

In this mode, the user of this device can compensate the altitude by increasing or decreasing the preliminary altitude information displayed on the displaying device 160 by operating the compensating switching switch SW3 and the altitude compensating switch SW4 and observing the data displayed on the displaying device 160 to coincide the displayed data with the accurate altitude information at the location where the measurement is being taken.

Next, the starting switch SW is again turned ON, the mode is changed to the measuring mode 199a and in this mode, other altitude information will be generated by carrying out the altitude measuring operation one time. The altitude displaying information obtained by adding the compensation value previously calculated in the altitude compensating mode 196a to the instant altitude information, is displayed on the displaying device 160 and simultaneously therewith the mode is returned to the brief measuring waiting mode 194 to complete the one cycle of the brief measuring mode.

Next, the continuous measuring mode 193 will be explained below.

In this mode, although the main process starting from the continuous measuring waiting mode 195 to a measuring mode 199b through an altitude compensating mode 196b is carried out in the same manner as described with respect to the brief measuring mode 192, there is a difference in that the operation in the measuring mode 199b is carried out continuously at regular intervals, and the measuring mode 199b will be returned to the continuous measuring waiting mode 195 by operating the starting switch SW.

As mentioned above, in the altitude measuring mode 190 in the present invention, the altitude compensating mode 196 is designated previously to designating the altitude measuring mode by providing the altitude compensating mode 196 between the waiting mode 185 and the measuring mode 199 whereby an accurate altitude measurement can always be obtained.

Next, the operation of the variation information generating circuit 170 will be explained below.

The time signal S60 is output from the time signal generating circuit 8 at every hour; and this signal S60 is applied to the OR gate circuit 151e in the display switching means 152.

Therefore, the pressure measuring mode will be entered at one hour intervals because the pressure measuring signal S50 is changed to "H" every hour corresponding to the time signal S60.

Further, as the time signal S60 is also supplied to the NOR gate circuit 111y, the OR gate circuit 120c, and 111v in the control signal generating circuit 111, the measuring signal $S_{ff}$ output from the NE-FF 111z is changed to "L" causing the reset signal $S_{re}$ to be "L" to start the pressure measuring operation in the brief measuring mode.

The pressure information $D_i$ thus measured is input into the latch 170a and the terminal A of the comparator 170b, while the pressure information $D_i'$ measured one hour previously and which had been latched in the latch 170a corresponding to the time signal S70 generated from the time signal generating circuit, has been input to the terminal B of the comparator 170b.

Further, when the pressure information $D_i$ is greater than the pressure information $D_i'$, the signal $S_{h1}$ indicating a pressure increase is output from the output terminal O1 of the comparator 170b to be input to the terminal B of the data switching circuit 130a in the data switching means 130, while when the pressure information $D_i$ is smaller than the pressure information $D_i'$, the signal $S_{h2}$ indicating a pressure decrease is output from the output terminal O2 of the comparator 170b to be input to the terminal B of the data switching circuit 130b in the data switching means 130.

In this situation, as the compensating mode signal $S_{ho}$ is "L", when the pressure is increased, the variation displaying mark 160b is turned ON (refer to FIG. 13 (E)) while when the pressure is decreased, the variation displaying mark 160c is turned ON (refer to FIG. 13 (F)), and further, when there is no variation in pressure, both of the marks 160b and 160c are turned OFF; and thus the variation in pressure can be indicated through these variation displaying marks 160b and 160c.

On the other hand, in this embodiment, the pressure information generating means 5 and the altitude information generating means 6 are provided separately by the sensor information data processing circuit, although the pressure information and the altitude information may, of course, be obtained in such a way that the microcomputer 105e and 150e, which is one component of the pressure information generating means 5, and the altitude information generating means 6, respectively, are substituted for one microcomputer.

It is apparent that the whole circuit of this invention may be operated by a one-chip microcomputer by using a microcomputer comprising a sensor information data processing circuit in common with the controlling signal generating circuit 111, the altitude compensating means 90, the mode designating means 151, the variation information generating circuit 170, and the display switching means 130 or the like.

In this embodiment, the output of the A/D converter circuit is supplied to both the pressure information generating means 5 and the altitude information generating means 6, although the output thereof may be supplied only to the pressure information generating means 5 to output the pressure information signal $D_i$, and the altitude information may be obtained by converting the pressure information signal $D_i$ into the altitude information signal $D_k$.

Moreover, in this embodiment, the pressure variation information is obtained by comparing the pressure information $D_i$ thus measured with the pressure information $D_i'$ measured one hour previously although, it may be obtained by comparing the digital converting data $D_c$ output from the A/D converter 4, and further, the amount of the variation in pressure may be indicated by the size of the displaying mark.

Moreover, as an example of the brief measuring mode, the case in which the measuring operation is carried out only one time in one cycle thereof is explained above, although a number of such measuring operations, may be carried out only in the predetermined time interval.

The device for measuring the pressure and the altitude of the present invention, can be applied to any kind of device needed to check this information for use, for example, in a wristwatch or the like.

Figure 20:
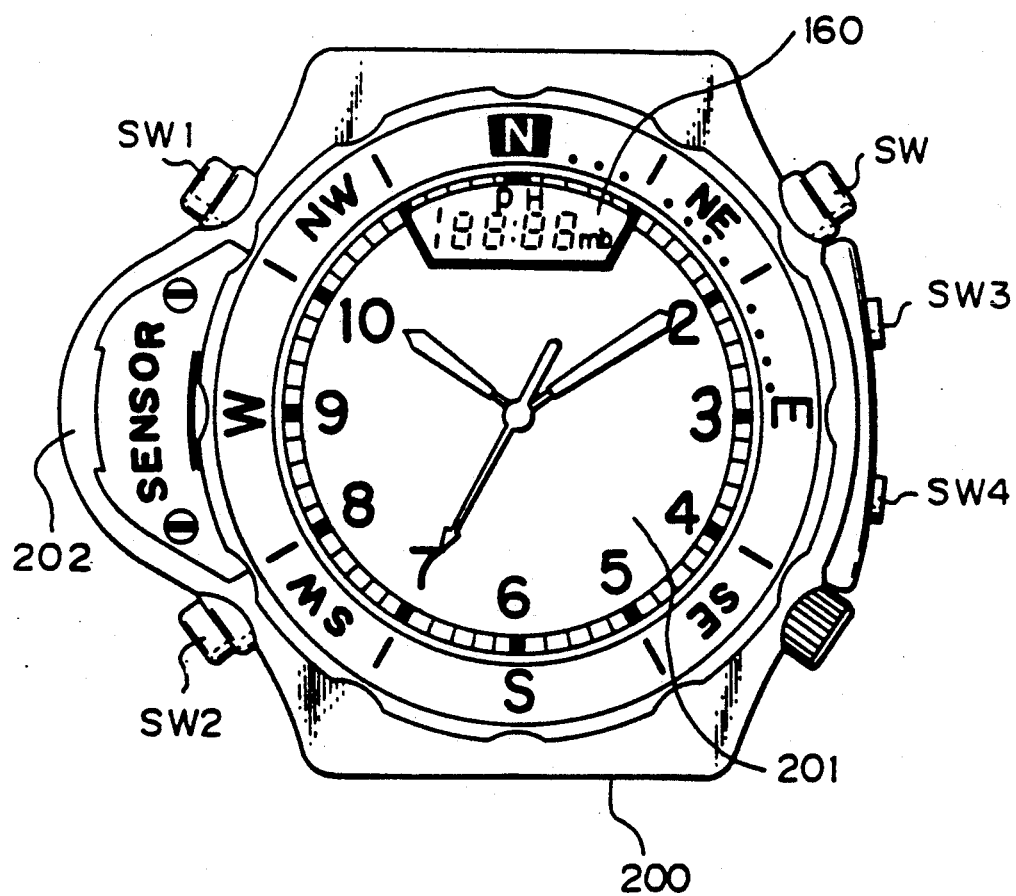
FIG. 20 shows one example of the face construction of a wristwatch using the device of the present invention, the mode of which is set to the continuous measuring mode.

The FIG. 20 shows one example of the face configuration of a wristwatch using the concept of this invention.

In FIG. 20, a displaying device 160 of the present invention is provided on the indicating board 201 of the wristwatch 200, and the starting switch SW, the mode selecting switch SW1, the pressure-altitude selecting switch SW2, the compensating switching switch SW3, and the altitude compensating switch SW4 are also provided on the side edge thereof.

The sensor unit of this invention is contained in the projected portion 202 of the wristwatch 200 as previously stated.

EXAMPLE 3

Figure 9A:
Figure 9A:
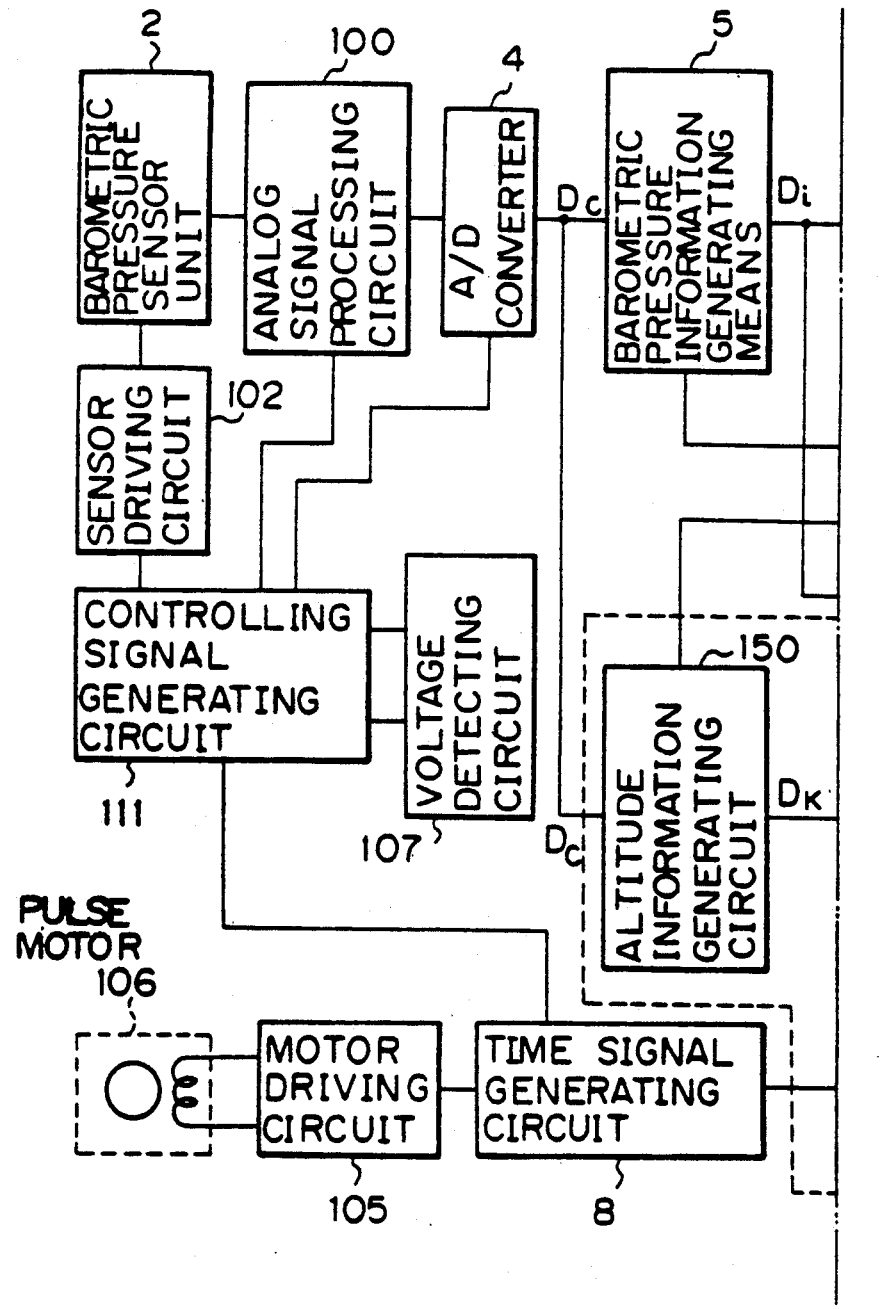
Figure 9B:
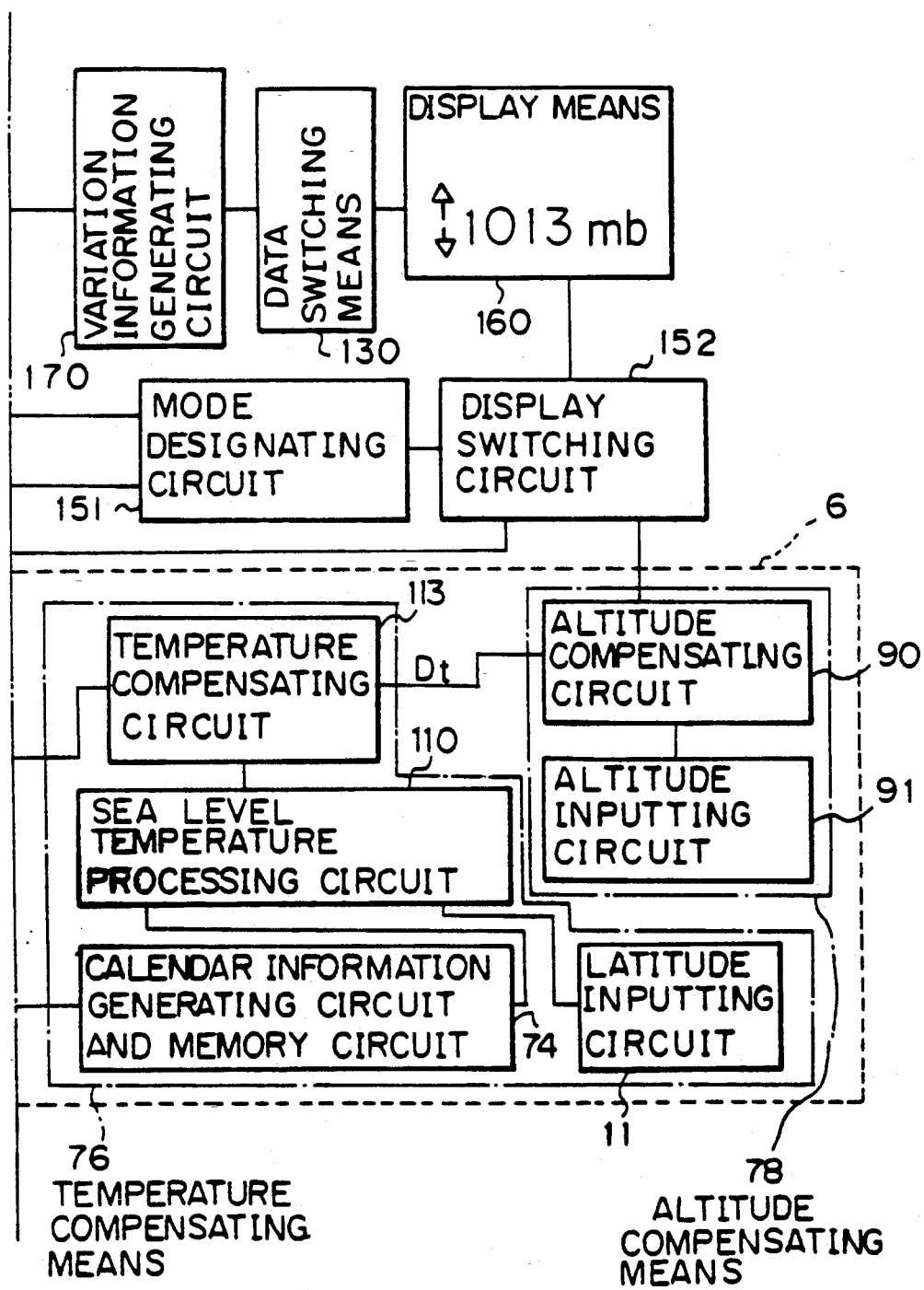

In FIG. 9, the third embodiment of this invention is disclosed in which a temperature compensating circuit is included in the altitude information generating means 6. A block diagram of FIG. 9, indicating the detailed composition of the altitude information generating means 6 having circuitry corresponding to that of shown in FIG. 2, is disclosed.

A temperature compensating circuit 113 similar to the first altitude processing circuit 13 shown in FIG. 2 is provided between the altitude information generating circuit 150 and the altitude compensating circuit 90, and the temperature compensating circuit 113 is connected to a circuit 110 for processing a temperature at sea level, which is further connected to an altitude compensation information inputting circuit such as a latitude inputting circuit 11, and a calender information generating circuit 74 with a memory circuit for storing the temperature coefficient actuated by the time signal generating circuit 8. The rest of the circuitry thereof is similar to that of shown in FIG. 8.

EFFECT OF THE INVENTION

As is apparent from an above explanation, according to the present invention, a portable device having the functions of both barometric pressure detection and altitude detection can be obtained without greatly increasing the production cost thereof by using a common circuit such as a barometric information sensor circuit or the like.

And as stated above, it is apparently unavoidable to use an altitude detector with compensation because the altitude calculated utilizing the model equation (1) having a relationship between barometric pressure and altitude frequently is different from the actual altitude when such data is used as an altitude detector because the condition when the calculation was carried out is usually different from the standard atmospheric pressure used as a model. However, in this invention, the altitude compensating mode is designated prior to the designation of the altitude measuring mode.

Therefore, the device of the present invention will appeal to the user as an altitude detector which is used with compensating altitude for obtaining an actual altitude so that even a person who does not know how to use an altitude detector can be prevented from using it incorrectly.

Further, in the altitude compensating mode, the indication displaying which type of compensation is done by utilizing the variation displaying marks so that anyone can correctly operate the device.

Also in this invention, barometric pressure variation information indicating an increment or decrement of pressure can be indicated on the displaying device separately from the pressure information so that the variation in barometric pressure can be seen without special attention, making this device a useful measuring means, especially in places where variations in climate are extreme, and thus it can be used for predicting variations in climate.

Furthermore, in the present invention, as the measuring mode selecting means for selectively designating either the brief measuring mode, in which the altitude information generating means is operated briefly, or the continuous measuring mode in which it is operated continuously, the user can use the device in the continuous measuring mode in situations in which the altitude varies quickly such as a ropeway, a lift, an elevator or the like, while in situations other than the above, the device can be operated in the brief measuring mode to reduce battery consumption.

Moreover, in accordance with the present invention, the affect on altitude caused by the barometric pressure at sea level can be reduced enough to be ignored as in a conventional altitude detector. Since the affect caused by the temperature at sea level, which varies depending upon the season, can be automatically compensated by the time measuring function of this invention, when this device is used at approximately the same latitude, thus providing an altitude detector having a low error rate throughout the year.

We claim:

1. An altitude and barometric pressure measuring device, comprising:
   a barometric pressure sensor including an amplifier for outputting an amplified analog signal from said sensor corresponding to the sensed atmospheric pressure;
   an analog to digital converter for converting the amplified analog signal to a digital output signal;
   a barometric pressure information generating means for outputting, when operated, data corresponding to atmospheric pressure in accordance with said digital output signal of the converter;
   an altitude information generating means for outputting when operated, data corresponding to the altitude of the device in accordance with said digital output signal of the converter;
   mode designating means for selectively operating the barometric pressure information generating means in a pressure measuring mode for outputting the data corresponding to atmospheric pressure, or the altitude information generating means in an altitude measuring mode for outputting the data corresponding to the altitude of the device; and
   display means responsive to the output data for displaying selectively information indicative of the operation of said barometric pressure information generating means or said altitude information generating means.

2. The device of claim 1 wherein the altitude information generating means comprises
   compensating circuit means operative when activated to compensate the altitude data output to the display device; and the mode designating means includes means for activating the compensation circuit means when in an altitude compensating mode.

3. The device of claim 2 wherein the mode designating means includes means for activating the compensating circuit means prior to outputting data from the altitude information generating means at times when the designation means is in the altitude measuring mode.

4. The device of claim 1 wherein the mode designating means includes means for operating the altitude information generating means repetitively in a continuous operating mode, and includes means for operating the altitude information generating means momentarily in a brief term operating mode, and means for selecting in the alternative the continuous operating mode and the brief term operating mode.

5. The device of claim 1 wherein the pressure measuring mode includes a waiting mode for operating the pressure information generating means to output data at predetermined intervals.

6. The device of claim 4 wherein the means for operating the altitude information generating means in the continuous operating mode includes a continuous measuring waiting mode, an altitude compensating mode, and an altitude measuring mode for measuring altitude in accordance with compensating data of the altitude compensating more, the altitude measuring mode being responsive to the compensating mode.

7. The device of claim 4 wherein the means for operating the altitude information generating means in the brief term operating mode includes a brief measuring waiting mode, an altitude compensating mode and an altitude measuring mode for measuring altitude in accordance with compensating data of the altitude compensating mode, the altitude measuring mode being responsive to the altitude compensating mode.

8. The device of claim 6 or 7 wherein the altitude compensating mode includes a preliminary measuring mode for inputting data for each operation of the brief measuring waiting mode.

9. The device of claim 1, wherein said altitude information generating means includes an altitude information generating circuit, an altitude compensating means for compensating information data output from said altitude information generating circuit, and means for outputting the compensated altitude information from the altitude compensating means prior to the output from said altitude information generating means.

10. The device of claim 1 further comprising altitude compensating means for compensating data output from the altitude information generating means in response to input data, and an external information input circuit operable by an external operating device for supplying the input data to the altitude compensating means.

11. The device of claim 1 further comprising temperature compensating means for inputting data relating to temperature to the altitude information generating means.

12. The device of claim 11, wherein said temperature compensating means includes an external information input circuit responsive to an external operating device for inputting the data to the altitude information generating means.

13. The device of claim 10 or 12, wherein said external information input circuit is responsive to information corresponding to at least one of information corresponding to latitude and information corresponding to altitude.

14. The device of claim 9, wherein the altitude compensating means includes an altitude compensating circuit responsive to external input information for the altitude information generating means.

15. The device of claim 11 wherein the temperature compensating means includes means for obtaining data relative to temperature at sea level for compensating the data from the altitude information generating means.

16. The device of claim 11 wherein the temperature compensating means includes a latitude information input circuit responsive to a manually operable device for outputting information relating to latitude, a calendar information generating circuit responsive to a time signal generating device for generating calendar information, a processing circuit for determining the temperature at sea level in accordance with the generated calendar information and the latitude output information, a temperature compensating circuit responsive to processed sea level temperature for generating a compensated temperature output; and further comprises altitude compensating means including an altitude compensating circuit responsive to the compensated temperature output, and an altitude input circuit responsive to an external input of actual latitude for generating compensated altitude information.

17. The device of claim 1 further comprising a barometric pressure variation information generating circuit for generating output information indicating in the alternative an increment or a decrement of barometric pressure in accordance with corresponding successive barometric pressure data measurements of the barometric pressure information generating means.

18. The device of claim 17, further comprising a display means for indicating barometric pressure variation information with a mark indicative of the existence of a pressure variation, in response to the output of the pressure variation information generating circuit.

19. The device of claim 17 wherein the altitude information generating means includes
- a calendar information circuit responsive to a time signal generation circuit for outputting calendar information;
- a temperature memory circuit for storing a temperature coefficient in accordance with calendar information generated by the calendar information circuit;
- a latitude memory circuit for storing latitude information input from an external operating device;
- an altitude information generating circuit for calculating the altitude in accordance with atmospheric pressure data output from the analog to digital converter;
- a temperature compensating circuit for compensating the data generated by the altitude information generating circuit in accordance with data from at least one of the temperature and latitude memory circuits; and
- an altitude compensating circuit for compensating the altitude information output from the temperature compensating circuit.

20. The device of claim 17 wherein the altitude information generating means includes
- a calendar information circuit responsive to a time signal generation circuit for outputting calendar information;
- a temperature memory circuit for storing a temperature coefficient in accordance with the calendar information generated by the calendar information circuit;
- a latitude memory circuit for storing latitude information input from an external operating device;
- a processing circuit for determining the atmospheric temperature at sea level in accordance with the temperature memory circuit and the latitude memory circuit;
- an altitude information generating circuit for calculating the altitude in accordance with atmospheric pressure data output from the analog to digital converter;
- a temperature compensating circuit for compensating data generated by altitude information generating circuit in accordance with data from at least one of the temperature and latitude memory circuits; and
- an altitude compensating circuit for compensating the altitude information output from the temperature compensating circuit.

* * * * *